(12) United States Patent
Hill et al.

(10) Patent No.: US 7,954,335 B2
(45) Date of Patent: Jun. 7, 2011

(54) ATMOSPHERIC WATER HARVESTERS WITH VARIABLE PRE-COOLING

(75) Inventors: James W. Hill, Macon, GA (US); Christopher G. Preston, St. Petersburg, FL (US); Michael D. Max, St. Pete Beach, FL (US); Allen C. Hunter, St. Petersburg, FL (US)

(73) Assignee: Water Generating Systems LLC, Arlington, VA (US)

( * ) Notice: Subject to any disclaimer, the term of this patent is extended or adjusted under 35 U.S.C. 154(b) by 320 days.

(21) Appl. No.: 12/418,077

(22) Filed: Apr. 3, 2009

(65) Prior Publication Data
US 2009/0260385 A1    Oct. 22, 2009

Related U.S. Application Data

(63) Continuation-in-part of application No. 12/054,690, filed on Mar. 25, 2008.

(51) Int. Cl.
*F25D 21/00* (2006.01)

(52) U.S. Cl. .......................................... 62/272; 62/291

(58) Field of Classification Search .................. 62/272, 62/285, 291, 427, 498; 454/274, 334; 165/121
See application file for complete search history.

(56) References Cited

U.S. PATENT DOCUMENTS

| | | | |
|---|---|---|---|
| 3,259,181 A | 7/1966 | Ashley et al. | |
| 4,197,713 A | 4/1980 | Bulang | |
| 4,280,335 A * | 7/1981 | Perez et al. | 62/332 |
| 4,827,733 A * | 5/1989 | Dinh | 62/305 |
| 5,040,377 A | 8/1991 | Braun et al. | |
| 5,106,512 A | 4/1992 | Reidy | |
| 5,131,238 A * | 7/1992 | Meckler | 62/271 |
| 5,149,446 A | 9/1992 | Reidy | |
| 5,167,838 A * | 12/1992 | Wilensky | 210/768 |
| 5,181,387 A * | 1/1993 | Meckler | 62/59 |
| 5,203,989 A | 4/1993 | Reidy | |
| 5,230,466 A | 7/1993 | Moriya et al. | |
| 5,259,203 A | 11/1993 | Engel et al. | |
| 5,309,725 A | 5/1994 | Cayce | |
| 5,366,705 A | 11/1994 | Reidy | |
| 5,400,607 A | 3/1995 | Cayce | |

(Continued)

FOREIGN PATENT DOCUMENTS

JP    09089297    4/1997

(Continued)

OTHER PUBLICATIONS

Mar. 16, 2011 Non-Final Office Action, U.S. Appl. No. 12/054,690.

(Continued)

*Primary Examiner* — Mohammad Ali
(74) *Attorney, Agent, or Firm* — Kenneth M. Fagin, Esq.

(57) ABSTRACT

An atmospheric water harvester includes a cooling member over which humid air flows to condense moisture from the atmosphere. The cooling member may be the evaporator of a conventional, gas vapor-based refrigeration circuit. If a gas vapor-based refrigeration circuit is used, the compressor of the circuit may be variable speed. A fan or impeller used to move air through the system may also be variable speed. Preferred embodiments are reconfigurable between at least two operational configurations such that to varying degrees the incoming air may be pre-cooled, before it passes over the cooling member, by heat exchange with colder air that has already flowed over the cooling member.

33 Claims, 15 Drawing Sheets

U.S. PATENT DOCUMENTS

| | | | |
|---|---|---|---|
| 5,517,829 A | 5/1996 | Michael | |
| 5,553,462 A | 9/1996 | Taylor | |
| 5,578,280 A * | 11/1996 | Kazi et al. | 422/186.07 |
| 5,600,969 A * | 2/1997 | Low | 62/622 |
| 5,623,831 A * | 4/1997 | Mesher | 62/71 |
| 5,669,221 A | 9/1997 | LeBleu et al. | |
| 5,845,504 A | 12/1998 | LeBleu | |
| 5,893,408 A | 4/1999 | Stark | |
| 5,901,565 A | 5/1999 | Morton, Jr. | |
| 6,029,461 A | 2/2000 | Zakryk | |
| 6,058,718 A | 5/2000 | Forsberg et al. | |
| 6,170,271 B1 | 1/2001 | Sullivan | |
| 6,182,453 B1 | 2/2001 | Forsberg | |
| 6,209,337 B1 | 4/2001 | Edwards | |
| 6,269,650 B1 | 8/2001 | Shaw | |
| 6,319,410 B1 * | 11/2001 | Allington et al. | 210/634 |
| 6,427,454 B1 | 8/2002 | West | |
| 6,490,879 B1 | 12/2002 | Lloyd et al. | |
| 6,505,477 B1 | 1/2003 | Smith et al. | |
| 6,588,226 B1 | 7/2003 | Semrow et al. | |
| 6,644,060 B1 | 11/2003 | Dagan | |
| 6,684,648 B2 | 2/2004 | Faqih | |
| 6,739,142 B2 * | 5/2004 | Korin | 62/92 |
| 6,755,037 B2 | 6/2004 | Engel et al. | |
| 6,843,309 B2 | 1/2005 | Taniguchi et al. | |
| 6,868,690 B2 | 3/2005 | Faqih | |
| 6,898,943 B2 | 5/2005 | Tanaka | |
| 6,978,631 B2 | 12/2005 | Fuller | |
| 7,028,478 B2 * | 4/2006 | Prentice, III | 60/645 |
| 7,086,239 B2 | 8/2006 | Haas et al. | |
| 7,121,101 B2 | 10/2006 | Merritt | |
| 7,194,870 B1 | 3/2007 | O'Brien et al. | |
| 7,246,503 B1 | 7/2007 | O'Brien et al. | |
| 7,272,947 B2 | 9/2007 | Anderson | |
| 7,328,584 B2 | 2/2008 | Craven | |
| 7,343,754 B2 | 3/2008 | Ritchey | |
| 7,373,787 B2 | 5/2008 | Forsberg et al. | |
| 7,514,056 B2 * | 4/2009 | Fradette et al. | 423/220 |
| 2003/0014983 A1 * | 1/2003 | Maisotsenko et al. | 62/121 |
| 2004/0134853 A1 * | 7/2004 | Miller, III | 210/603 |
| 2004/0244398 A1 | 12/2004 | Radermacher et al. | |
| 2005/0039467 A1 * | 2/2005 | Korin | 62/92 |
| 2005/0103615 A1 | 5/2005 | Ritchey | |
| 2006/0032493 A1 | 2/2006 | Ritchey | |
| 2006/0053819 A1 | 3/2006 | Wu et al. | |
| 2006/0086112 A1 | 4/2006 | Bloemer et al. | |
| 2006/0101838 A1 | 5/2006 | Ritchey | |
| 2006/0201162 A1 | 9/2006 | Hsieh | |
| 2006/0248904 A1 | 11/2006 | Ludwig | |
| 2006/0255164 A1 | 11/2006 | Oppermann et al. | |
| 2006/0257258 A1 | 11/2006 | Zwebner | |
| 2007/0012060 A1 | 1/2007 | Simons | |
| 2007/0028769 A1 * | 2/2007 | Eplee et al. | 95/113 |
| 2007/0039345 A1 | 2/2007 | Forsberg et al. | |
| 2007/0079624 A1 * | 4/2007 | Max | 62/285 |
| 2007/0095078 A1 | 5/2007 | Senf, Jr. et al. | |
| 2007/0137590 A1 * | 6/2007 | Vetrovec | 123/25 A |
| 2007/0175063 A1 | 8/2007 | Morgan et al. | |
| 2007/0277540 A1 | 12/2007 | Fernandes | |
| 2007/0280400 A1 * | 12/2007 | Keller | 376/317 |
| 2007/0295673 A1 * | 12/2007 | Enis et al. | 210/766 |
| 2008/0078842 A1 | 4/2008 | MacDonald | |
| 2008/0229764 A1 | 9/2008 | Taras et al. | |
| 2008/0282704 A1 | 11/2008 | Shalom | |
| 2008/0314062 A1 | 12/2008 | Ritchey | |
| 2009/0226308 A1 * | 9/2009 | Vandor | 415/178 |
| 2010/0059358 A1 | 3/2010 | Ritchey | |
| 2010/0263396 A1 | 10/2010 | Ritchey | |

FOREIGN PATENT DOCUMENTS

JP   2002267204   9/2002

OTHER PUBLICATIONS

Amendment and Response to Non-Final Office Action filed Mar. 19, 2011, U.S. Appl. No. 12/054,690.

Owner's Manual, Phoenix Restoration Equipment, 200 HT LGR Dehumidifier, Rev. Oct. 2007.

Int'al Search Report.

Written Opinion.

* cited by examiner

ATMOSPHERIC WATER HARVESTERS WITH VARIABLE PRE-COOLING

CROSS-REFERENCE TO RELATED APPLICATIONS

This application is a continuation-in-part of and claims priority to application Ser. No. 12/054,690 filed Mar. 25, 2008, the entire contents of which are incorporated herein by reference.

GOVERNMENTAL SUPPORT AND INTEREST

This invention was made with Governmental Support under Contract Number N00014-05-C-0378 dated Sep. 14, 2005, and issued by the Office of Naval Research (ONR). The Government has certain rights in the invention.

FIELD OF THE INVENTION

The invention relates to atmospheric moisture harvesting and improvements in the efficiency of condensing water from air and in apparatus relating thereto. More particularly, the invention provides improved energy efficient extraction of water from air, particularly in outdoor settings and over a range of relative humidity.

BACKGROUND OF THE INVENTION

Atmospheric water harvesting is intended to produce water in the general vicinity of its place of use. Producing potable water near its place of use removes the requirement for either temporary or fixed water delivery systems such as pipelines and canals or temporary delivery systems such as bulk motorized water tankers. Production of high-quality water at or near its place of use is superior to transporting bottled drinking water, which requires substantial consumption of energy for delivery and waste disposal. Water harvesters are also superior environmentally because water bottle disposal is not an issue; water bottles are reused in conjunction with water harvesting. In addition, the water produced from suitably designed and operated water harvesters is pure and suitable and safe for drinking with very little treatment.

Water harvesting has not generally been regarded as a replacement for conventional piped water supplies because of its relatively higher cost and lower volumes. In present water systems, there is an effective "waste" of public high quality water that is used for low-quality uses, such as flushing toilets and watering lawns.

Conventional water supplies are running short because of increased demand and local overuse of natural water supplies. In addition, the cost of conventional water supplies is increasing significantly. One of the drivers of increased water cost is the incorporation of desalinated water, which is relatively expensive to produce using current technologies, in the basic supply. Perceptions about the quality of public water supply has led to bottled water being used increasingly as a regular personal drinking water source, even though it is much more expensive than public water supply.

In atmospheric water harvesting, condensation of water is achieved by providing and maintaining a chilled surface upon which water from moist air condenses. This is well known as a byproduct of chilling air, as in air conditioning systems in which chilling the air is the objective or in air dehumidification systems in which the objective is to achieve relative dryness of the exhaust air. However, water produced as a byproduct in these systems is more expensive to produce than that which is produced in a water harvester apparatus that is optimized for energy efficient water production by not overcooling air or water. In addition, byproduct water quality is generally not suitable for drinking, and can be dangerous, without additional treatment that is not provided for by an apparatus that does not have water production as a primary objective.

Water harvesting apparatus that has been specifically designed to produce water from air already exists (but without the efficiency and sophistication of this invention) which allows the production of water of the same or superior quality as bottled water but without the delivery or environmental waste issues and in quantities that are suitable for personal or family use on a regular and extended basis. Water harvesting provides high quality potable water without the continued cost of producing bottles directly in proportion to the quantity of water delivered, at a lower cost than bottled water.

SUMMARY OF THE INVENTION

The present invention provides improved apparatus and methods for condensing water from air. These improvements involve, but are not limited to, an improved water condenser, improved condenser airflow control, a variable speed air impeller, forced air or conductive cooling of all heat-producing parts of the system, new intake air controls, and provision for system-controlled on/off switching for the compressor. The apparatus is robustly designed and constructed, is resistant to common handling vibration and shock, and is meant to be moved by hand locally although it may also be fixed. The apparatus is intended for use either outdoors or indoors in a semi-autonomous mode, and where air quality is generally good. Water is pumped from a removable collection tank underneath the evaporator into which water has flowed by gravity, either directly or through a water treatment system to the user. Although the water exiting the water harvester has the character of distilled water and is very pure, for prolonged drinking of this water alone, some of the produced water should be remineralized.

Preferred embodiments are reconfigurable between at least two operational configurations such that to varying degrees incoming air may be pre-cooled, before it passes over a cooling member, by heat exchange with colder air that has already flowed over the cooling member.

BRIEF DESCRIPTION OF THE DRAWINGS

The invention will now be described in greater detail in connection with the Figures, in which.

DETAILED DESCRIPTION OF EMBODIMENTS OF THE INVENTION

Figure 1:
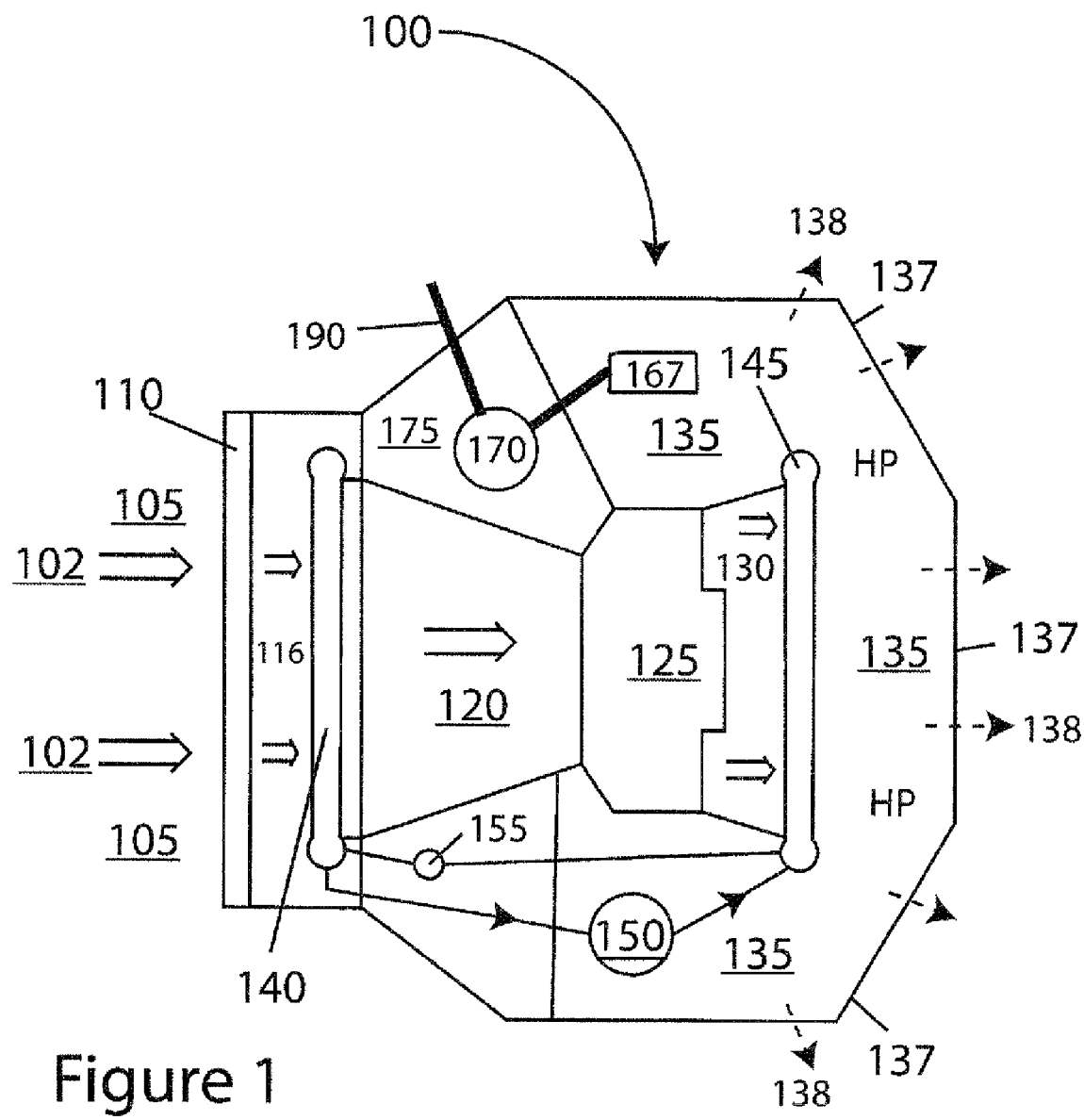
FIG. 1 is schematic plan view of a first embodiment of an atmospheric water harvester according to the invention.

FIG. 1 shows a first embodiment 100 of an atmospheric water harvester (AWH) according to the invention. The apparatus for drawing in and exhausting air and refrigeration causes water vapor to be condensed into liquid water within an enclosed apparatus so that it can be collected. The apparatus 100 may be placed out-of-doors, where it is surrounded by moist air. Ambient air 102 is drawn into the AWH 100 under suction and expelled under pressure. This AWH 100 includes an airflow system having an intake 105; an air filter 110; and air passages 116, 120 upstream from an impeller or fan 125. The impeller/fan 125 is responsible for drawing air into and forcing it through the apparatus 100 and into an exhaust chamber 135, from which the air exits through vents 138 (venting air is indicated by dashed-stem arrows) in the external vented wall 137 of the high-pressure exhaust chamber 135. The refrigeration system in general includes an evaporator (cooling member) 140 in which liquid refrigerant is allowed to vaporize, thereby causing the evaporator 140 to become cold and cooling the air passing across it so as to condense water from the air; and a compressor 150, in which the refrigerant gas from the evaporator 140 is compressed into a liquid by the combination of higher pressure and cooling of the refrigerant by air forced through a condenser 145.

Ambient air 102 is drawn in through the filter assembly 110, which may include more than one filter or type of filter, into the pre-evaporator air passage 116. Water is condensed from the air on the evaporator/heat exchanger 140 as the air is pulled through it. Condensation on the evaporator is the key process of atmospheric water harvesting. The condensation process is made as efficient as possible by using a high-thermal-transfer heat exchanger for the evaporator, for instance, a narrow-bore PF$^2$ heat exchanger manufactured by the Modine Manufacturing Company. In order to prevent aluminum or other metals from the evaporator from being dissolved in condensing water, a coating is applied to the evaporator 140. The coating also may have antibacterial properties. Among, but not limited to, examples of this type of coating are a silver ion-containing epoxy available from Burke Industrial Coatings and another (Alcoat 5000 or similar) available from Circle-Prosco that also offers corrosion protection and may assist shedding of water from the condensing surface of the evaporator 140.

Regarding the compressor 150, a fixed or variable speed compressor may be used. In one configuration of an AWH according to the invention, a fixed speed compressor, which is the simplest type and is most commonly used in refrigeration apparatus, is used. Such compressors are cycled on and off to minimize their running time. They are commonly operated along with a temperature-sensing device 155 that measures and controls the system superheat, which is the difference between the temperature of the gas entering the compressor 150 and the evaporation temperature of the liquid refrigerant within the evaporator 140. This device 155 (e.g., a thermostatic expansion valve (TXV or TEV), amongst other types of electronic and mechanical devices) is located between the condenser 145 and the evaporator 140. It controls temperature in the evaporator 140, in which vaporization of the refrigerant is directly related to cooling potential, by metering the flow of fluid refrigerant through the system. In an alternate configuration, a variable speed compressor 150 is used, which runs almost continuously but only as fast as necessary to maintain the desired pressure differential between the evaporator 140 and the condenser 145. A temperature-sensing device 155 that measures and controls the system superheat may be used with this sort of variable-speed compressor as well. In either of these configurations, a cut-off switch (not shown here), which is operated by sensors that detect freeze-up on the evaporator, turns off the compressor to allow ice to melt before restarting.

Figure 2A:
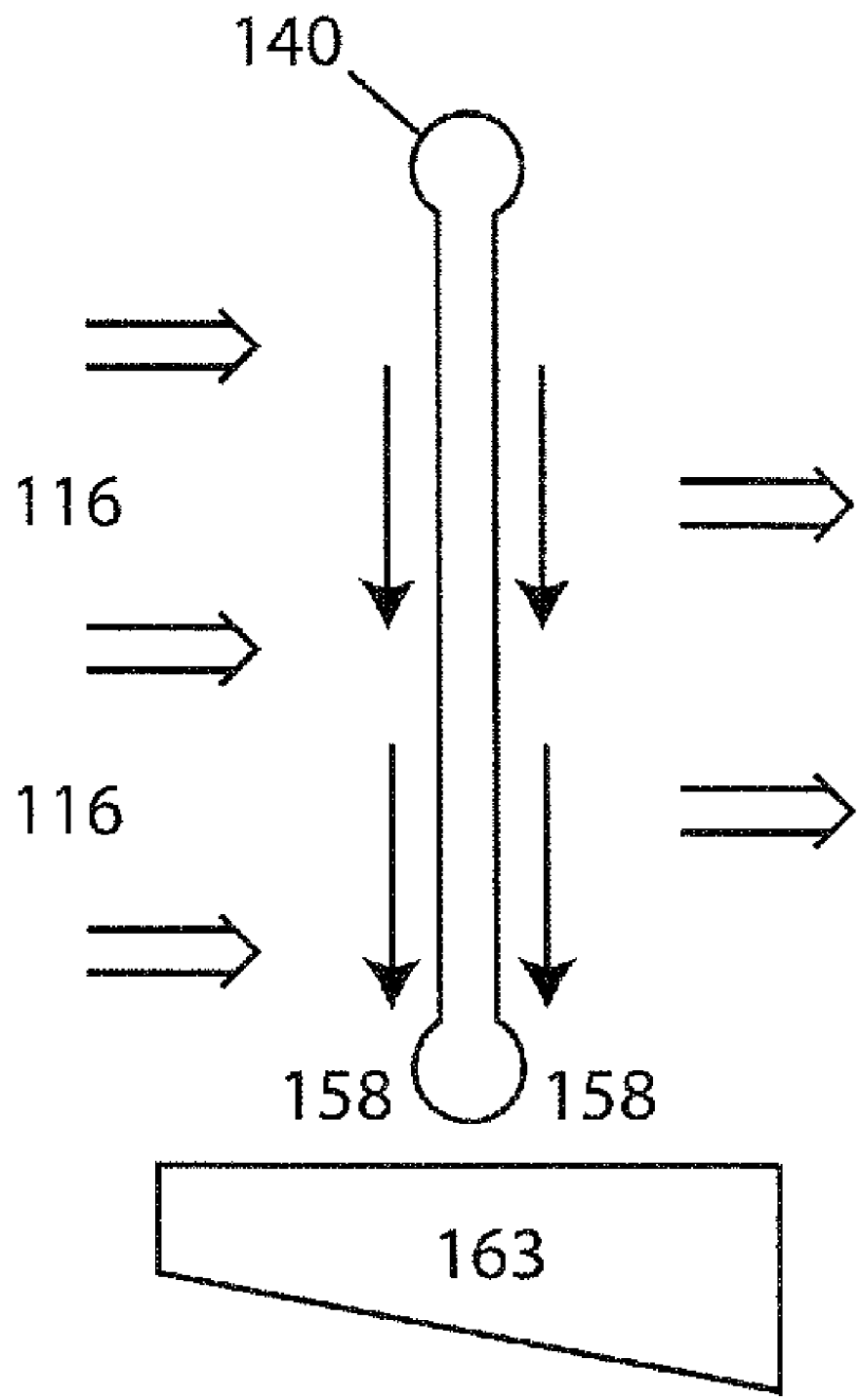
FIGS. 2a and 2b are schematic side views of two alternative orientations, respectively, of a heat exchanger/evaporator used in an atmospheric water harvester according to the invention.

In the AWH embodiment 100 shown in FIG. 1, the evaporator 140 is in a vertical orientation, as shown in FIG. 2a. Water (black, single stem arrows) 158 formed on the upper evaporator surfaces flows down over the subjacent evaporator surfaces, which has the effect of amalgamating the water into rivulets as well as droplets as it flows from the evaporator 140 to the subjacent water collector 163. Because rivulets are more coherent water masses with higher mass to surface area ratios, they are less liable to lose water to the airstream moving at about a 90 degree angle across the flowing condensed water. Additionally, the water passing from the evaporator 140 to the water collection tank 163 may be only very slightly affected by air flow, which does not impinge toward the water collection tank 163.

Figure 2B:
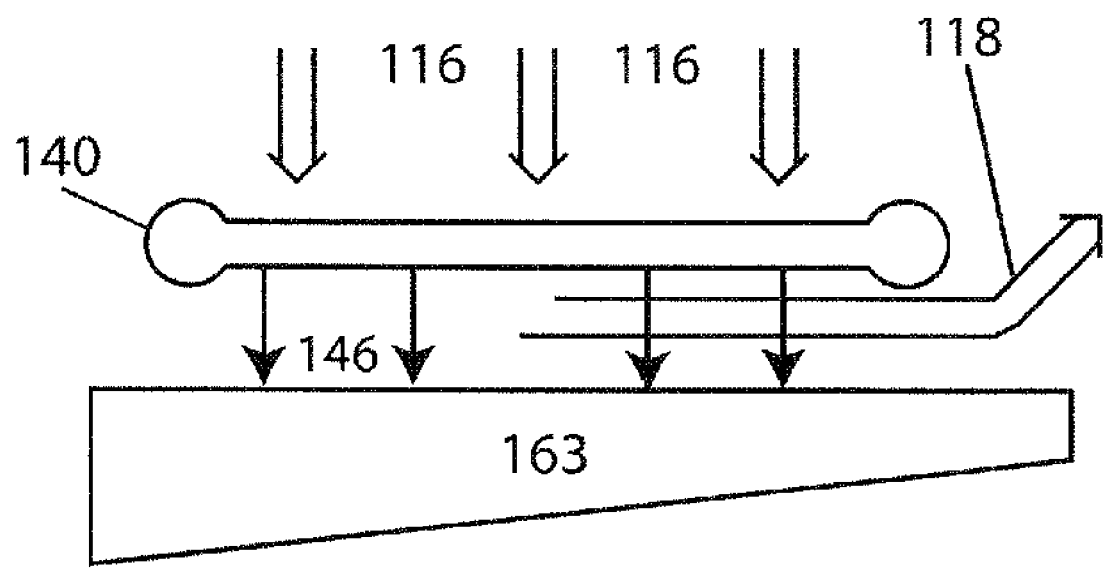

With an alternate orientation of the evaporator as shown in FIG. 2b, water is removed from a horizontally oriented evaporator (also labeled 140) by forced air moving in the same direction as the condensed water separating from the evaporator 140. Water droplets 146 flow directly downward (single-stem black arrows) under the combined influence of gravity and forced air into the water collection tank 163. Water is more rapidly removed following condensation, which may have the result of reducing overcooling of already condensed water and allowing better heat transfer than in the case of coalescing water flowing over the evaporator. This is because water on the evaporator 140 acts as an insulator against heat transfer between the evaporator surface and the moist air 114. This horizontal orientation minimizes run-off of amalgamated or rivulet/coalesced water on the evaporator surface in favor of keeping most of the water in the form of droplets until it leaves the evaporator. However, droplets 146 have to cross the exhaust air path 118 and may be entrained in the air. Angled evaporators (not illustrated) would have attributes intermediate between upright or vertical and horizontal evaporators.

Water that has condensed on the evaporator 140 flows downward by gravity into a water collection region tank 163 beneath the evaporator and then into a removable water collection tank (not shown) that is from five to ten gallons or greater in capacity. Multiple tanks allow users to carry water from the water harvester. Alternatively, water may be pumped from the collection tank by a pump 167, located in the body of the AWH, through an industry-standard replaceable water filter 170 that is located in a compartment 175 that is isolated from the airflow passages within the apparatus. Treated water 190 that has passed through the water treatment system 170 remains under pressure after passing through the filter and exits from ports (not shown) at either or both the top and sides of the apparatus 100. (A straight-through water filter body without a filter may be used to produce water that is to be used for industrial purposes or that is otherwise not required to be treated to drinking water standards.)

Air exiting from the evaporator on which water has condensed then passes into an air passage 120 under suction caused by the fan/impeller 125. The air from the fan/impeller 125 then passes through a downstream air passage 130 and through the vaned condenser 145, where the air cools the compressed refrigerant that is being pumped to the condensor 145 from the compressor 150. After heat exchange warms it, the exhaust air passes into an exhaust chamber 135 from which it is exhausted through louvers in the walls of the AWH 100, the approximate locations of which are shown by arrows.

In a suitable configuration of the AWH 100, the impeller or fan 125 is capable of running at variable speed, which is controlled by varying electrical current or voltage. This allows the impeller or fan to force air though the apparatus at different velocities to optimize water production on the evaporator with respect to the electrical energy consumed. A variable speed impeller or fan allows the airflow over the evaporator to be varied, optimizing water production by, for instance, increasing fan speed for high humidity air or preventing or remediating unintended freeze-up where slower airflow could otherwise allow the air to reach a dew point below freezing. (Slowly moving air can be cooled to lower temperatures and has a greater likelihood of reaching dew points below freezing, regardless of the original air temperature.) Alternatively, the fan or impeller may be fixed speed, which may be less efficient under a wide range of input air temperature and humidity conditions but less expensive to implement and not significantly more expensive to operate under consistently humid conditions such as may be found on tropical, low-lying, smaller islands.

Sealed electronic controls and computer systems that control the refrigeration and airflow system for all embodiments of this invention are integrated in a control pad (not shown) that is located in the top cover of the water harvester for easy operation. In order to prevent overheating of the electronic control pad, the bottom surface of the electronic control pad is a conduction heat exchanger that is exposed to the cold airflow stream upstream and/or downstream from the condenser. Thus, heat that may be produced within the pad or by heating of the pad externally by heat exchange with ambient air or heating by the sun may be removed and the pad kept within operating temperature conditions.

In the embodiment 100, the compressor 150 is located within the exhaust air chamber 135. Where a compressor is used that is designed to be cooled internally, for instance using refrigerant discharge inside the compressor, there is no need for other cooling of the compressor. With that type of compressor, it is possible to insulate it with noise-absorbing material for quieter operation. The air within this chamber is slightly over-pressured with respect to ambient air outside the apparatus, which allows for distribution of air within the chamber 135 in the direction of sidewall vents. Air vents that form a large proportion of the side of the enclosure are located generally in the exterior sidewall 137 of the exhaust chamber 135 (exhaust air shown by black arrows but actual vents may be widespread in the wall) in order to allow air to vent from the apparatus.

Figure 3:
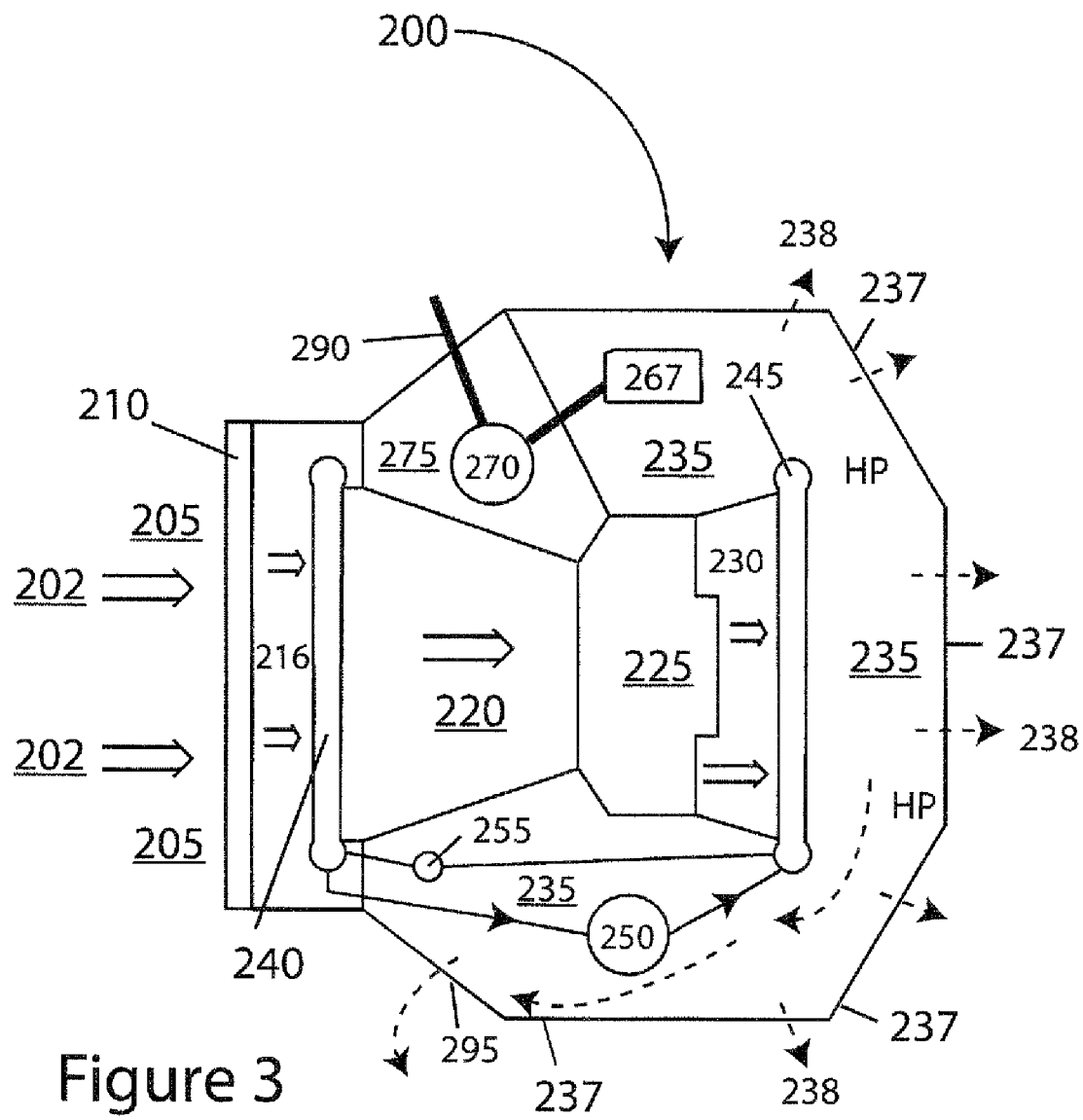
FIGS. 3 and 4 are schematic plan views of second and third embodiments, respectively, of an atmospheric water harvester according to the invention, which second and third embodiments are generally similar to the first embodiment shown in FIG. 1.
Figure 4:
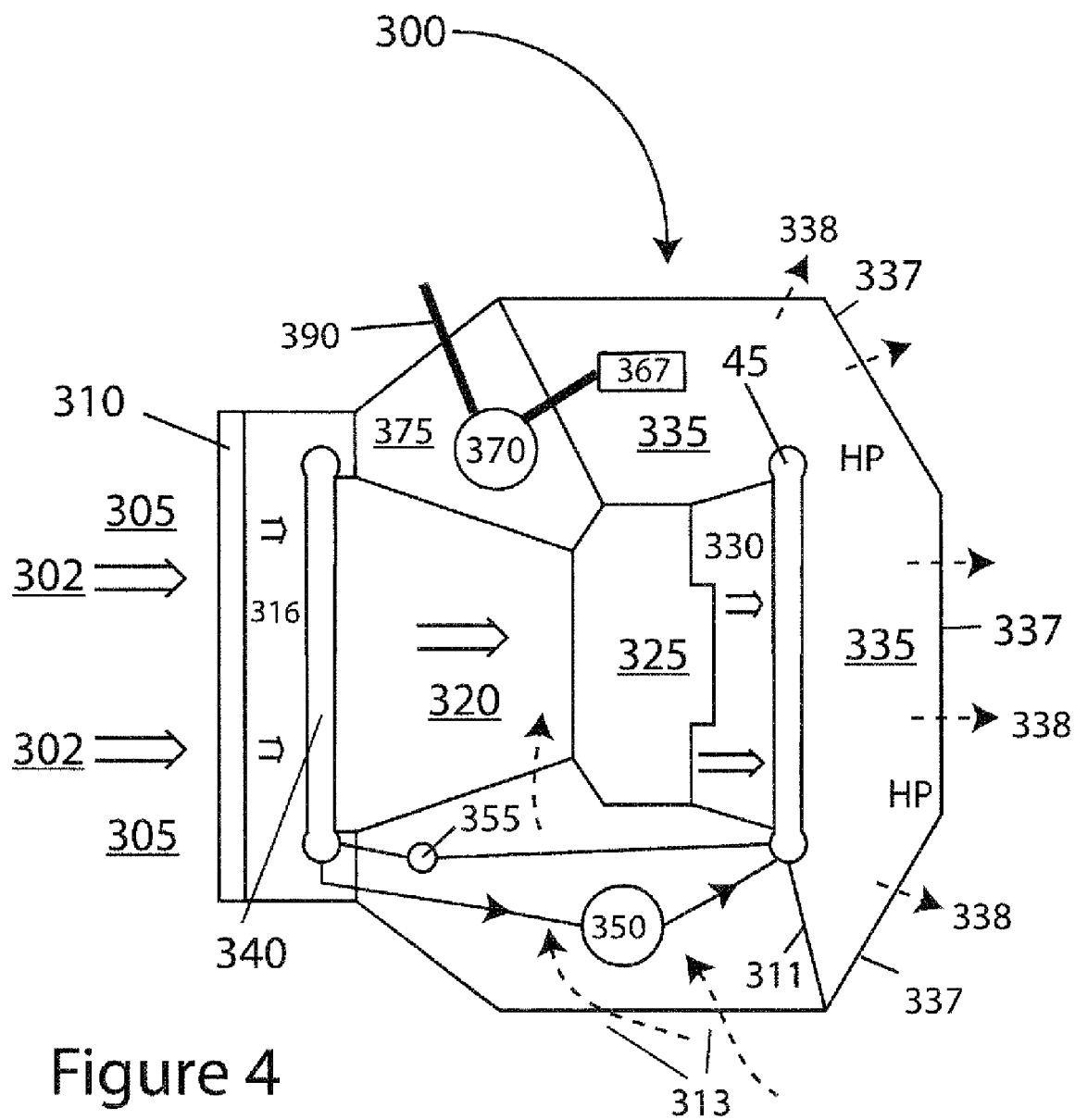

Two further embodiments 200, 300 will be described with reference to FIGS. 3 and 4, respectively, in which there are slight variations in the handling of air within the AWH following extraction of water from it. In these embodiments 200, 300 (as well as in another embodiment 400, as described below), similar system components are similarly numbered, but increased to the corresponding hundreds series to "match" the embodiment number 200, 300, 400. Unless otherwise described, the similarly numbered components are the same as or generally similar to those described above and may have similar attributes.

Where an AWH must be operated in very hot ambient temperatures, or where a compressor that requires external cooling is used, forced-air cooling may be provided by controlling airflow in two general manners. These are shown in FIG. 3, in which an embodiment 200 uses existing exhaust for cooling of the compressor 250, and in FIG. 4, in which an embodiment 300 uses a supplemental supply of ambient air for cooling the compressor 350. FIG. 3 shows airflow around the compressor 250 from the central part of the exhaust chamber 235 created by locating louvered sidewall vents 295 "downstream" from the compressor 250. This configuration forces air to pass the compressor 250 in exiting from the exhaust chamber 235. In the alternate embodiment 300 shown in FIG. 4, an internal partition 311 isolates the compressor 350 from the exhaust chamber 335. In this configuration, vents 313 in the outer hull of the AWH 300 allow air to be pulled in by suction into the air passage 320 upstream from the impeller 325.

The three embodiments 100, 200, 300 that have been described above will work best in high relative humidity (RH) conditions. In general, where RH is high, particularly where temperature is also high and relatively large amounts of water are dissolved in the air, condensation on the evaporator takes place by reducing the temperature of the humid air to the point where condensation initiates. Where intake air is at a high humidity, for instance in excess of 85% RH, water will begin to condense with relatively little energy consumed by chilling. The sensible heat of the humid air (which is the term applied to heat associated with temperature change) must be removed to lower the temperature of the air slightly and bring the air to 100% RH locally, at which point condensation is initiated. As condensation proceeds, the latent heat (which is that required to cause the water vapor to condense to liquid water) is removed by heat exchange on the evaporator. Following the initiation of condensation, both sensible heat and latent heat are removed from the air being processed in the AWH as the air temperature is further reduced slightly and water is condensed and extracted. When RH is low, on the other hand, it is beneficial to be able to remove sensible heat before the air reaches the evaporator so that the cooling potential of the evaporator continues to remove a minimum of sensible heat and a maximum of latent heat, which has the effect of maintaining the energy efficiency of water production. (High humidity ambient air requires very little additional cooling to initiate condensation.) The delivery of air to the evaporator at approximately 90-99% RH, which is the general range for humid ambient air, is the primary objective for the most economic water production through condensation.

Figure 5:
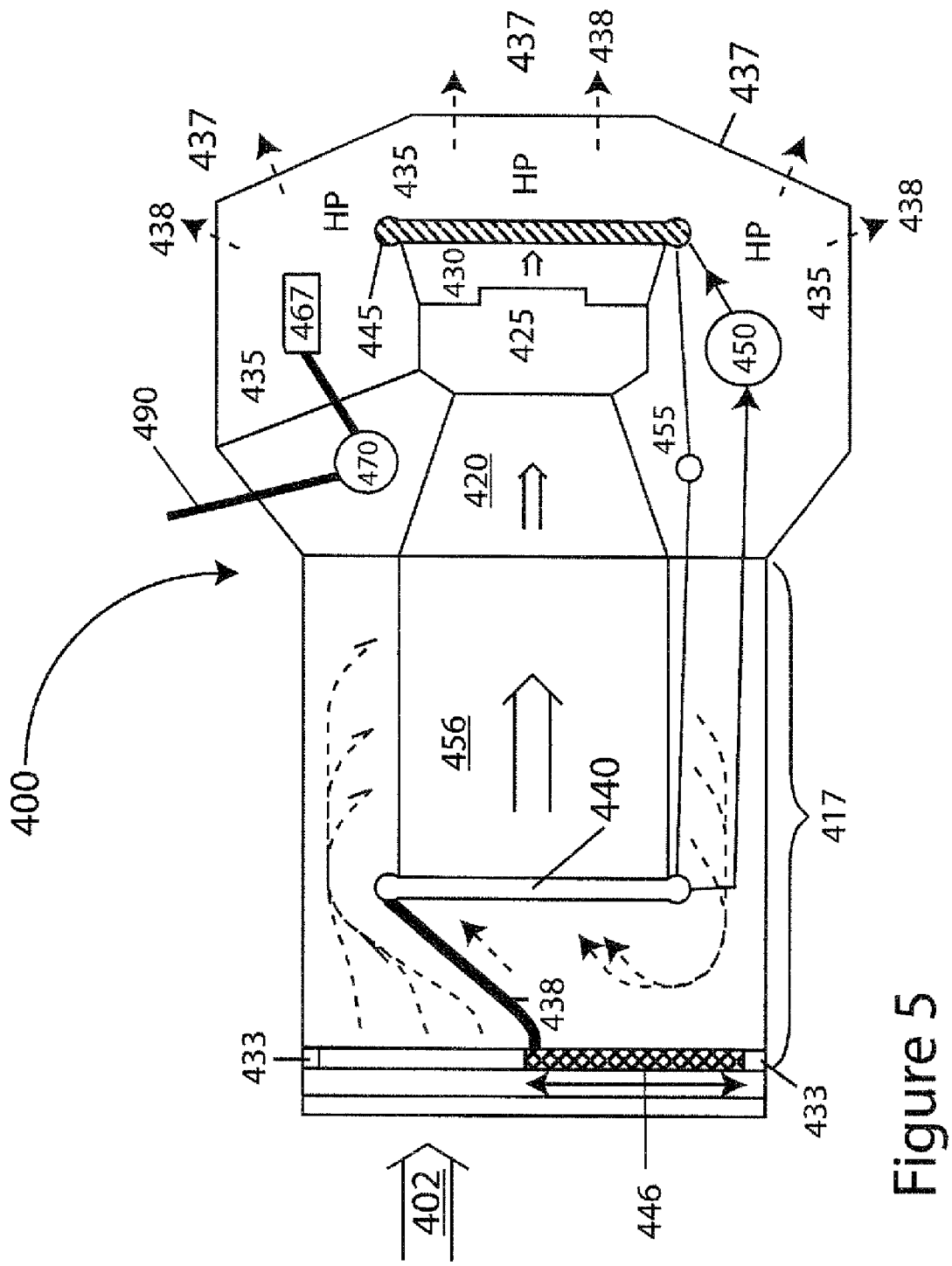
FIGS. 5 and 6 are schematic plan views of a fourth embodiment of an atmospheric water harvester according to the invention illustrating the atmospheric water harvester in two different operational configurations.
Figure 6:
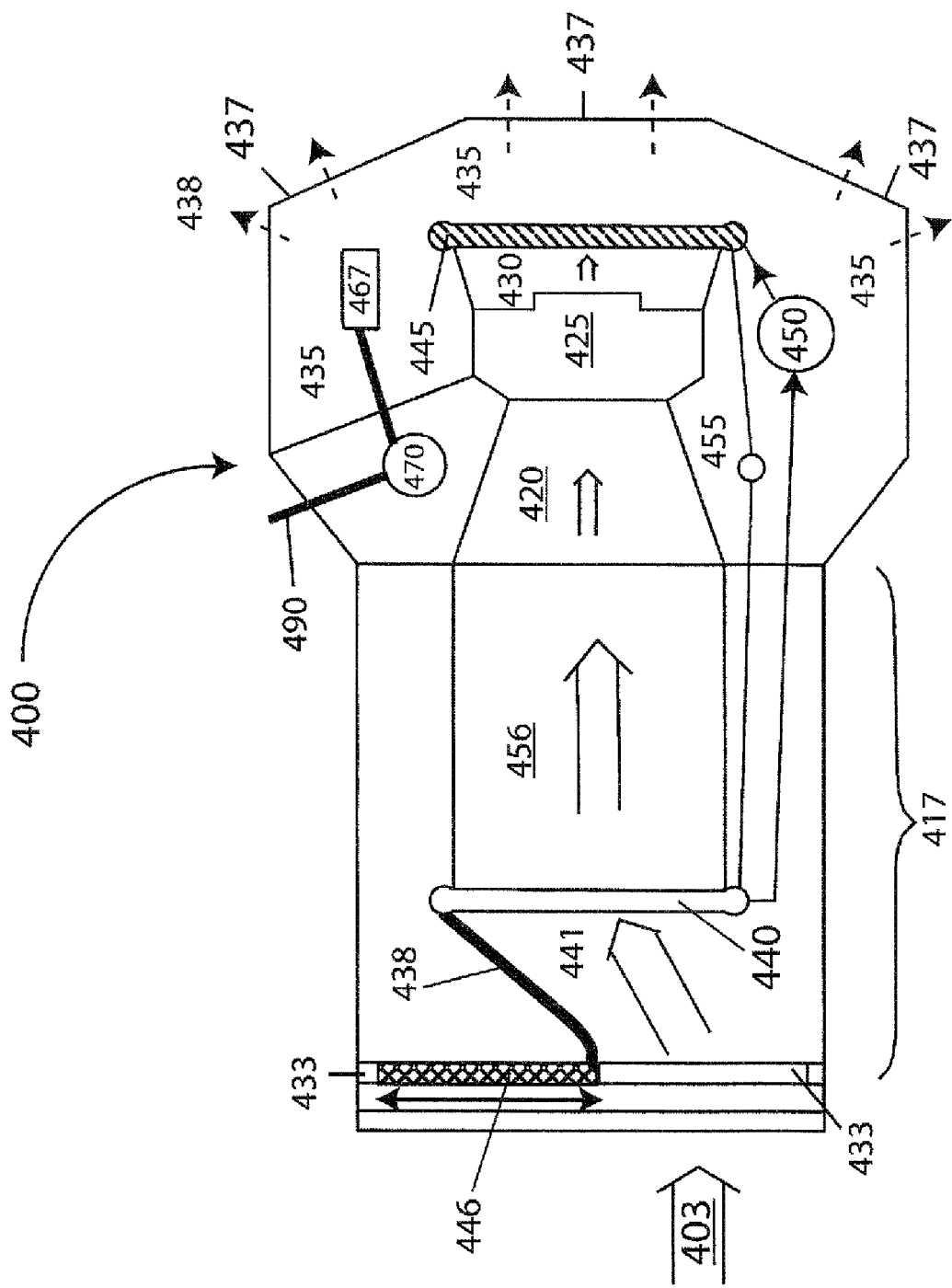

A variable pre-cooling embodiment 400 of an AWH, which is configured to operate well under low as well as high ambient RH conditions and preferably at RH points in between, is illustrated in FIGS. 5 and 6. Most notably in comparison to the embodiments 100, 200, 300 described above, the embodiment 400 includes a variable flow geometry thermal economizer section 417 located upstream of the impeller 425 and its inlet air passageway 420. The thermal economizer section 417 is suitably housed within a forward extension of the AWH housing and includes an air-to-air heat exchanger 456 located between the evaporator 440 (i.e., downstream from the evaporator) and the impeller 425 (i.e., upstream of the impeller). Preferably, the heat exchanger 456 is directly connected to the evaporator 440 and the impeller entry air passageway 420, or is connected via ducting to those components, such that air does not seep out from between the evaporator and the heat exchanger or from between the heat exchanger and the impeller. A preferred air-to-air heat exchanger 456 is fabricated from thin-walled tubes (e.g., as available from Cesarroni Technologies); from thin-walled corrugated plastic plate (e.g., as available from Innergy Tech, AB Segerfroejd, or Greenbox); or from corrugated metal plate (e.g., as available from Xetex and Des Champs Technology). In general, such air-to-air heat exchangers include two sets (at least) of interleaved flow passageways that are typically arranged perpendicularly to each other. In the AWH embodiment 400, the heat exchanger 456 is arranged with 1) a first set of heat transfer flow passageways (not illustrated specifically) oriented longitudinally, i.e., generally aligned with the main or overall direction of flow through the AWH 400; and 2) a second set of heat transfer flow passageways (not illustrated specifically) that are oriented transverse to the first set of heat transfer flow passageways, i.e., laterally as in the embodiment 400 shown in FIGS. 5 and 6 or vertically.

Upstream of the heat exchanger 456, the air intake of the AWH 400, i.e., the entrance to the thermal economizer section 417, is configured to regulate the amount (if any) of air that flows through the second, transverse set of heat exchanger flow passageways. To that extent, a motorized sliding panel 446, mounted in a support or frame 433, is provided near the entrance to the thermal economizer section 417, and an airway partition 438 extends from a lateral mid-location—suitably but not necessarily the center—of the panel support or frame 433 to an end of the evaporator 440. Suitably, the panel 446 extends vertically from the top to the bottom of the thermal economizer section entrance; laterally, assuming the airway partition 438 abuts the frame 433 at the lateral center of the AWH 400, the panel 446 is slightly wider than half the width of the thermal economizer section entrance.

With this arrangement of the AWH intake, when the panel 446 is all the way to one side of the entrance to the thermal economizer section 417 (i.e., to one side of the airway partition 433) as shown in FIG. 5, a first inlet aperture 402 is formed on the opposite side of the airway partition 433. When the apparatus 400 is in this operational configuration, which provides a maximum amount of pre-cooling, air enters the thermal economizer section 417 through the first inlet aperture 402 and flows through the transverse (e.g., lateral) set of air passageways through the air-to-air heat exchanger 456. The air then turns and flows through the evaporator 440, which cools/chills the air to condense moisture out of it, before the air flows through the longitudinal set of air passageways through the heat exchanger 456 and on to the impeller. Because the air flowing through the longitudinal set of heat exchanger air passageways has been cooled by the evaporator 440, it will absorb sensible heat from the air flowing through the transverse set of heat exchanger air passageways, thus pre-cooling the incoming air before it reaches the evaporator 440. This allows a greater percentage of the evaporator work to be directed to removing latent heat from the incoming air and thus improves water production efficiency.

On the other hand, as noted above, it is relatively easy to condense moisture from ambient air that has high RH. Therefore, it becomes less important or beneficial to pre-cool the air before it passes across the evaporator 440. In this case, the panel 446 may be moved, for example, all the way across the entrance to the thermal economizer section 417 to the opposite side of the airway partition 433, which opens up a second inlet aperture 403 (i.e., a bypass inlet) as shown in FIG. 6. When the apparatus 400 is in this operational configuration, which provides a minimum amount of pre-cooling (for example, no pre-cooling at all) to the net airflow flowing through the airflow passageway before it flows across the evaporator 440, air enters the thermal economizer section 417 through the second inlet aperture 403 and flows immediately over evaporator 440, then down to the fan/impeller 425 through the longitudinal set of heat exchanger air passageways, without first having flowed through the transverse set of heat exchanger air passageways for pre-cooling. This improves operational efficiency in terms of amount of water produced per unit of electricity consumed. In particular, air density increases with humidity, and resistance to flow (i.e., frictional drag) increases with air density. Therefore, by shortening the overall airflow distance, and in particular by bypassing the portion of the flow course passing through the transverse set of heat exchanger airflow passageways, airflow drag is reduced. This, in turn, reduces operational load on the fan or impeller 425 and hence the cost to drive the fan or impeller for a given volumetric flow rate of air through the AWH 400. Alternatively, for a given amount of electricity consumed, the fan or impeller can be run faster (assuming it has that capability), which allows more water to be produced in a given period of time and at a given operating cost.

In practice, the panel 446 may be positioned at one or more points between the two endpoints shown in FIGS. 5 and 6, which provides for at least one, and suitably a plurality, of intermediate pre-cooling operational configurations between the maximum pre-cooling operational configuration and the minimum pre-cooling operational configuration. Depending on the position of the panel 446, the relative sizes of the first and second inlet apertures 402, 403 will vary, which regulates the amount of air flowing through the transverse set of heat exchanger airflow passageways and hence how much pre-cooling of the incoming air is provided. Suitably, the position of the panel 446, and hence the relative sizes of the inlet apertures 402, 403, is controlled automatically by a computer controller (not shown), which receives information on ambient conditions from on-board temperature and humidity sensors (not shown). Using pre-programmed maps or lookup tables, and/or using sensors that measure internal humidity levels at the evaporator so as to provide feedback-based control, the controller adjusts the position of the panel 446 such that the intake air is cooled to the point that 90% to 99% RH air is passing across the evaporator and/or until, at some point, the pre-cooling potential is at a maximum. From that point to lower temperatures and RH, an increasing amount of sensible heat has to be removed from the incoming air by the evaporator 440, which means that increasing electricity must be used to produce relatively smaller amounts of water. With such an automatic configuration of the AWH, the speed of the fan/impeller 425 may also be adjusted automatically (assuming it has variable speed capability).

In a simpler implementation, automatic control over the position of the panel 446, and hence the sizes of the intake apertures 402, 403, may be omitted. In that case, it may be preferable for the AWH 400 to be configured with springs, cams, detents, etc. (not shown) such that the panel 446 stably assumes only the position corresponding to the maximum pre-cooling operational configuration (e.g., the position shown in FIG. 5) or the position corresponding to the minimum pre-cooling operational configuration (e.g., the position shown in FIG. 6), but not positions in between, thus giving the AWH 400 just two operational configurations in practice. The user would then manually move the panel to one side or the other depending on humidity existing generally at the time the AWH is being operated.

Figure 7:
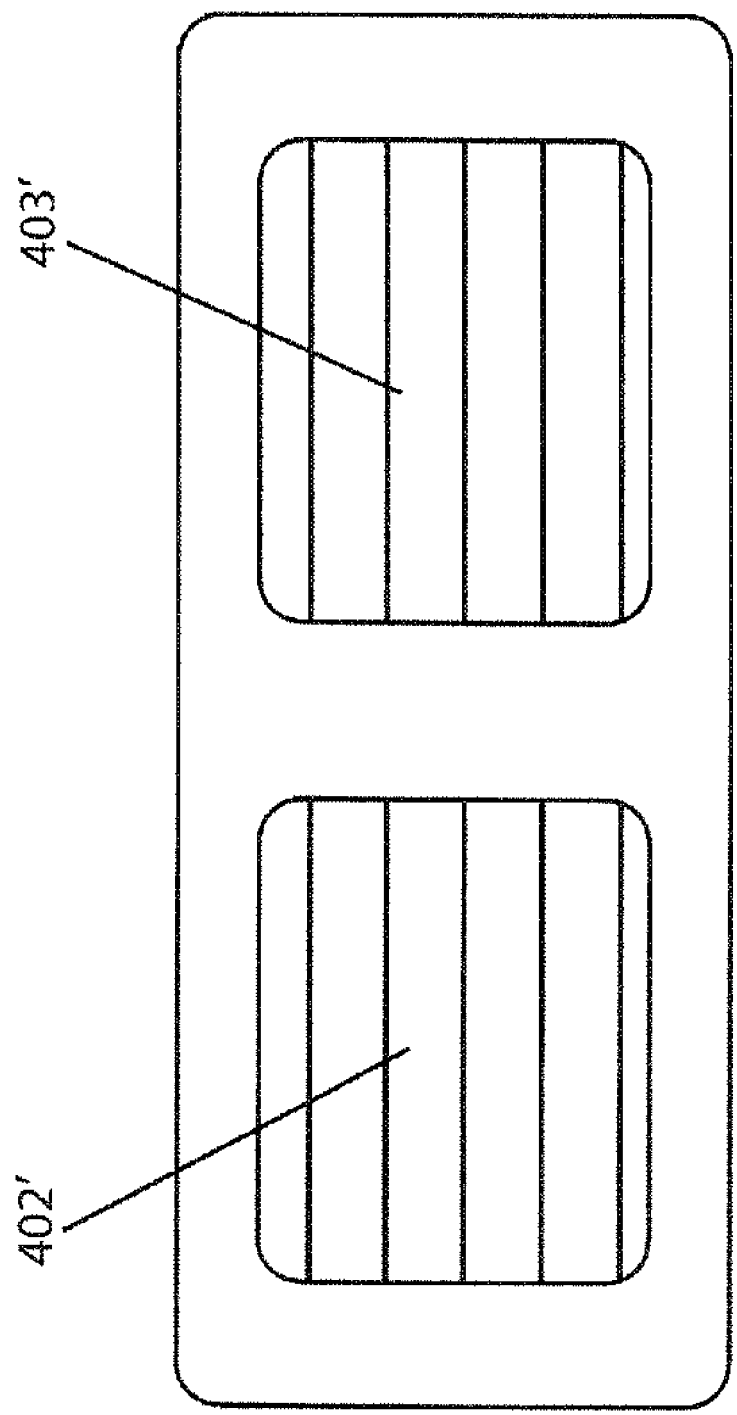
FIG. 7 is a schematic end view illustrating a variant of the embodiment of an atmospheric water harvester shown in FIGS. 5 and 6.

Furthermore, in the embodiment 400 of an AWH illustrated in FIGS. 5 and 6, the sizes of the two air intake apertures 402 and 403 are directly linked to each other and always vary inversely to each other as the position of the panel 446 changes. For finer control and optimization of efficiency (water produced per unit of electricity, water produced per unit of time, or water produced per volumetric unit of airflow), on the other hand, it may be desirable for the sizes of the air intake apertures to be independently controllable (preferably by computer). To that end, the air intake apertures may be formed by flow-restricting devices such as separate, louvered openings 402', 403', as illustrated in FIG. 7, sphincter openings, etc. (A variable speed fan/impeller is particularly suitable for use with such an embodiment to fine-tune operation of the AWH as much as possible.) In this case, one or more intermediate pre-cooling configurations of the AWH can be obtained via intermediate sizes for either or both of the air intake apertures.

Figure 8:
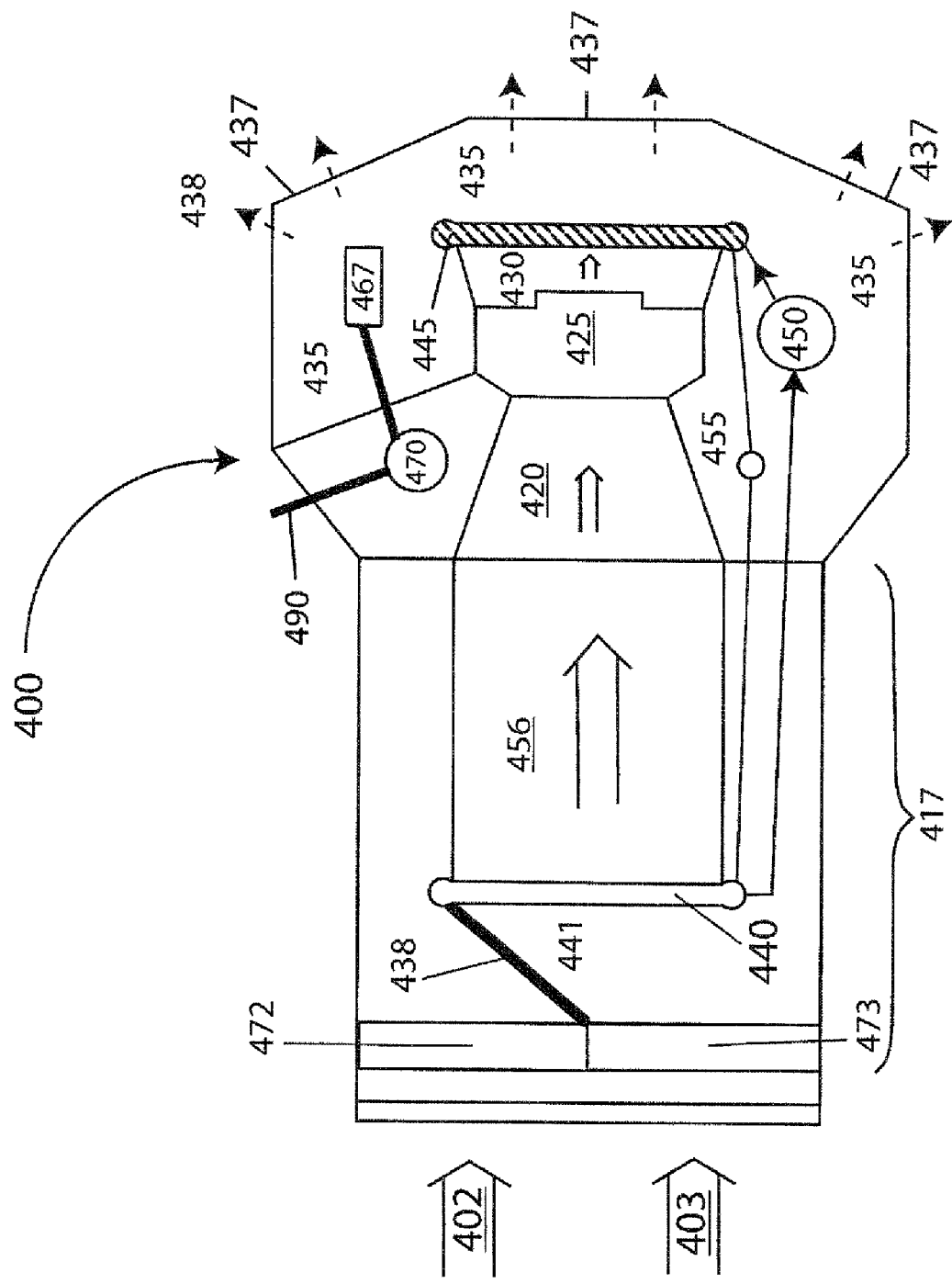
FIG. 8 is a schematic plan view illustrating a variant of the embodiment of an atmospheric water harvester shown in FIGS. 5 and 6.

Alternatively, instead of controlling the amount of airflow through each of the inlets 402', 403' by varying the size of their openings, it is possible to regulate the relative amounts of airflow by controlling the speed of the air flowing through each opening. To that end, a variable speed fan or impeller 472, 473 can be provided in association with each opening 402', 403', as shown in FIG. 8. In that case, the different operational configurations of the AWH would correspond to the different speeds of the fans, with maximum speed of one fan and minimum speed of the other fan defining one operational configuration limit value for the overall AWH (i.e., a maximum pre-cooling configuration); minimum speed of the one fan and maximum speed of the other fan defining another operational configuration limit value (i.e., a minimum pre-cooling configuration); and intermediate fan speed settings for either or both of the fans defining a theoretically infinite number of potential intermediate pre-cooling operational configurations of the AWH. Such variable speed fans or impellers could be provided in addition to the variable speed fan or impeller 425 or, alternatively, instead of the fan or impeller 425.

Various attributes of the embodiments 100, 200, 300 of AWH's described above (e.g., variable speed refrigeration compressor) may be incorporated into the embodiment 400 of an AWH as well.

In the embodiment 400 of an AWH described above, the various operational configurations of the apparatus are determined by the relative configurations of the airflow passageways in the device, as defined by the position of the panel 446 and/or by the size of the inlet openings. (In the embodiment 400, the size of the inlet openings is defined by the position of the panel 446 as shown in FIGS. 5 and 6; in the other referenced AWH configurations (e.g., inlets having louvers or other types of flow restrictors), on the other hand, the size of the inlet openings is independent.) Alternatively, the different operational configurations of the AWH may be defined by different operating speeds of inlet fans. In each of these embodiments, the operational configuration of the AWH is defined by attributes of the AWH that affect the relative amounts of air flowing through the two sets of passageways in the air-to-air heat exchanger, and hence the amount of pre-cooling that is achieved.

As an alternative to that approach to controlling the amount of pre-cooling that is achieved, it is possible, by using the appropriate type of heat-exchanger, to control the pre-cooling by varying the position of the heat exchanger itself. This illustrated in the embodiments 500 and 600 shown in FIGS. 9-10 and 11-12, respectively, in which heat pipes are exemplarily used as the heat exchangers. (Heat pipes are preferred due to their relatively simple construction and due to the fact that they are completely passive, stand-alone devices in that they require no other apparatus (e.g., compressors, circulation pumps, etc.) or electrical input to work.)

(Heat pipes are fairly simple and efficient devices that can be used to transfer heat from one region to another. Essentially, a heat pipe consists of a sealed, partially evacuated tube made from heat-conducting material (e.g., metal) that has a small amount of a working refrigerant fluid contained inside of it. (The particular working fluid is selected depending on the temperatures of the environment in which the heat pipe will be used.) One end of the tube is disposed in the region where cooling is required (i.e., where heat needs to be removed), and the other end of the tube is disposed in the region where heat is to be discharged. In the region to be cooled, the working fluid will be in liquid form. As the working fluid absorbs heat from the region to be cooled, it boils or vaporizes, and a vapor pressure differential causes the vaporized fluid to move toward the opposite end of the heat pipe. At that opposite end of the heat pipe, heat is discharged from the working fluid, e.g., by dumping the heat into a heat sink, blowing cooling air across the end of the heat pipe, etc., which causes the working fluid to condense back into liquid form. In its simplest form, the heat pipe is empty except for the working fluid; in that case, the condensed working fluid may flow back to the heat-absorbing region due to gravity. In other forms, the heat pipe includes wicking material of some sort, and the condensed working fluid flows back to the heat-absorbing region due to capillary action.)

Figure 9:
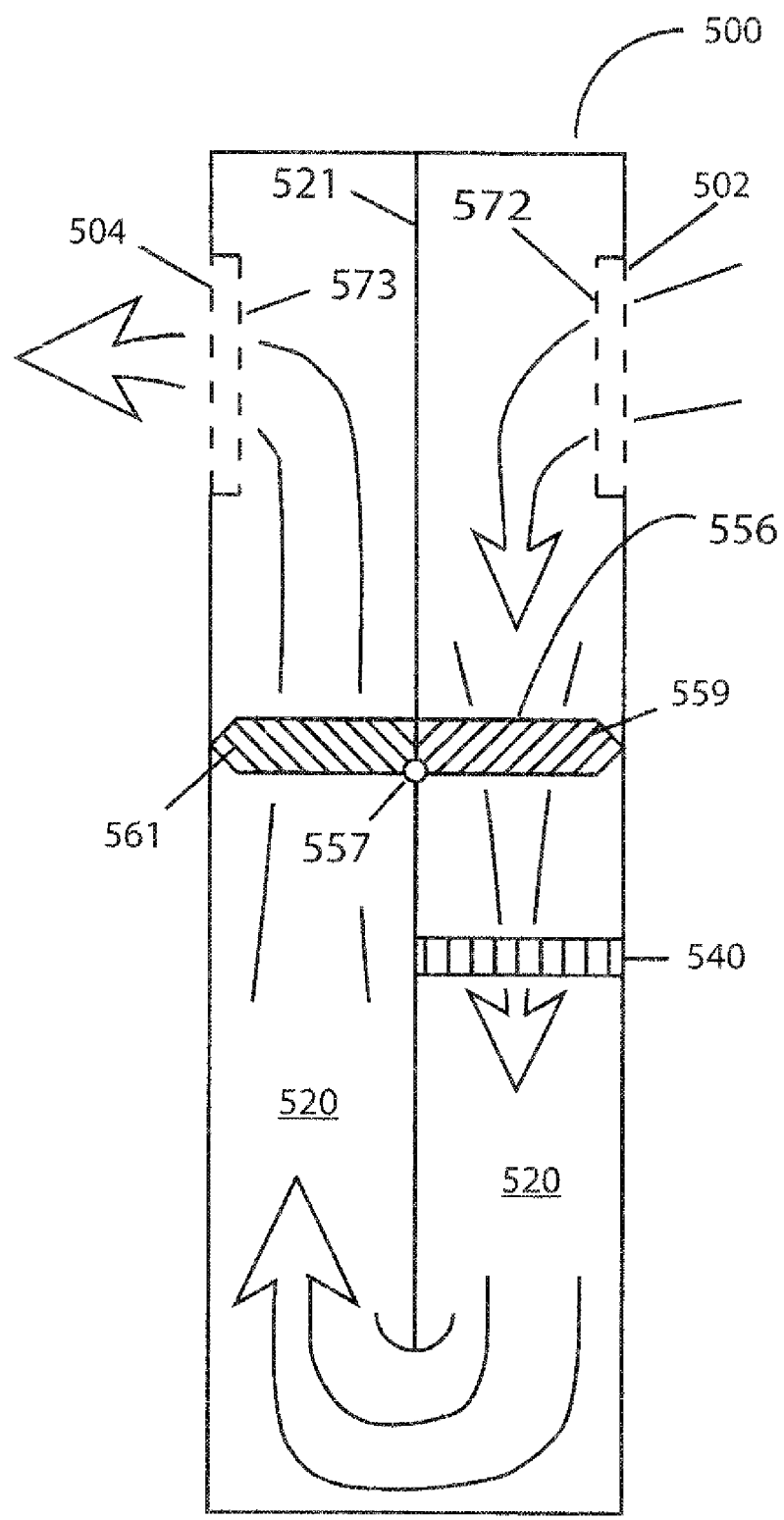
FIGS. 9 and 10 are schematic views (either plan or side elevation; either orientation would be acceptable) of a fifth embodiment of an atmospheric water harvester according to the invention illustrating the atmospheric water harvester in two different operational configurations.
Figure 10:
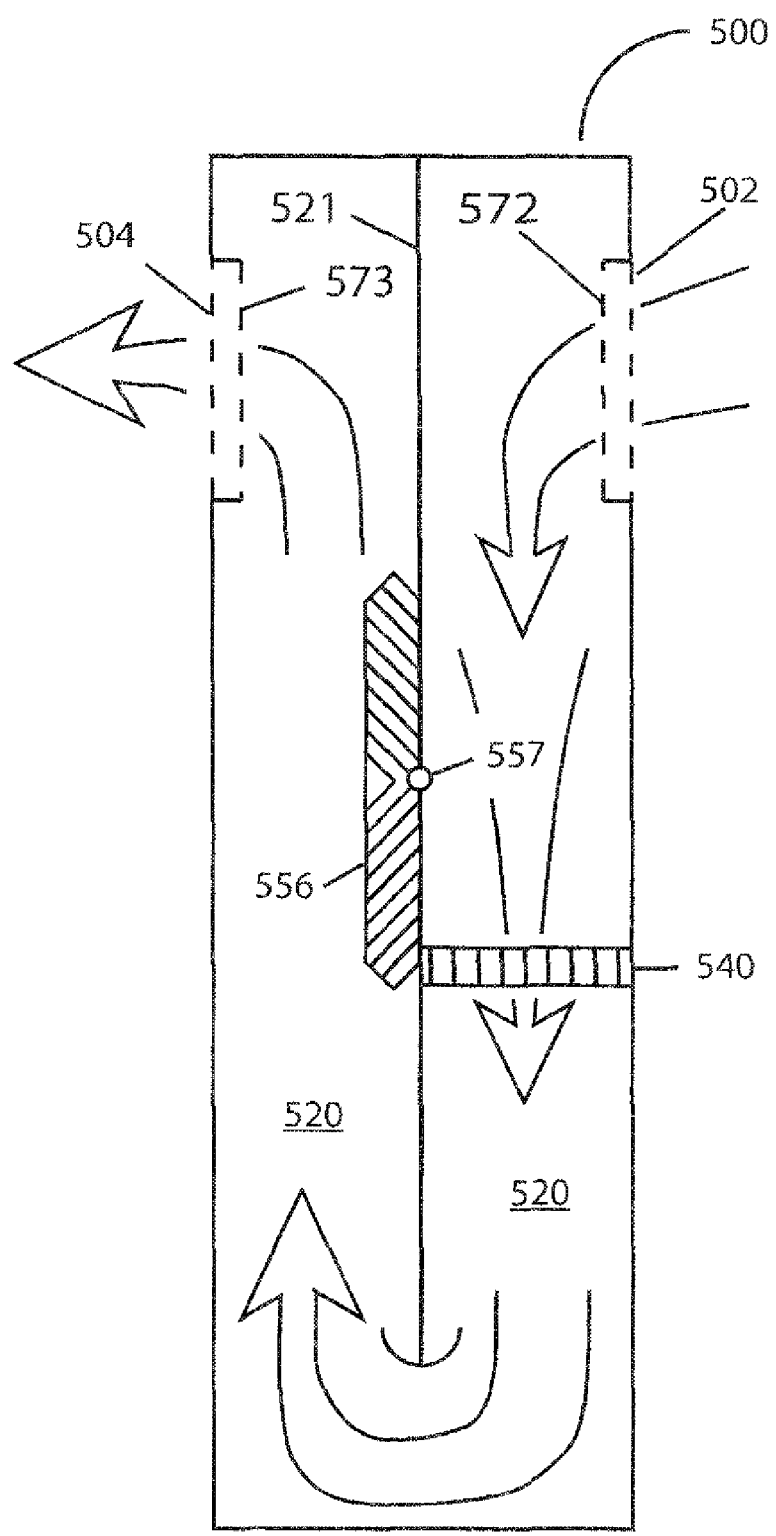

In the AWH embodiment 500 illustrated in FIGS. 9 and 10, a fixed-configuration airflow passageway 520 extends through the AWH from inlet 502 to outlet 504. The airflow passageway 520 is configured such that at least a segment of a downstream portion of the airflow passageway 520 is in proximity to at least a segment of an upstream portion of the airflow passageway. For example, as illustrated in FIGS. 9 and 10, the airflow passageway 520 may have a U-shape, in which case approximately half of the airflow passageway 520 (i.e., the portion to the left of the dividing wall 521 as shown in the figures) lies in proximity to the other approximate half of the airflow passageway 520 (i.e., the portion to the right of the diving wall 521 as shown in the figures). Evaporator (cooling member) 540 is located within the airflow passageway 520 and suitably extends all the way across it, as illustrated, so that all air flowing through the airflow passageway 520 must flow across/through it. (No other components of the refrigeration system in the embodiment 500 are illustrated, but they may be configured and located as per any of the embodiments described above.) One or more fans/impellers may be located at any suitable location to propel air through the airflow passageway 520. For example, fans 572, 573 may be provided at the inlet 502 and the outlet 504, respectively. The fan(s) may be single speed or variable speed depending on the desired sophistication of the system.

Furthermore, as noted above, the AWH embodiment 500 illustrated in FIGS. 9 and 10 uses heat pipes as the heat exchanger. In the embodiment 500, the heat exchanger 556 consists of an array of parallel, generally straight-tube configuration heat pipes. The heat exchanger 556 is repositionably mounted (e.g., by means of a pivot 557) so that it can be moved between a first position as shown in FIG. 9 and a second position as shown in FIG. 10, which two positions of the heat exchanger 556 define two operational configurations of the AWH embodiment 500. The first heat exchanger position (FIG. 9) is used when maximum pre-cooling of the incoming air is desired or required; the second heat exchanger position (FIG. 10), on the other hand, is used when minimum (e.g., no) pre-cooling of the incoming air is required or desired. As shown in FIG. 9, when the heat exchanger 556 is in the first position, one portion of it 559 (i.e., the portion having the heat-absorbing portions of the constituent heat pipes) extends into, and suitably all the way across, the portion of the airflow passageway 520 that is located upstream of the evaporator 540, and another portion 561 of the heat exchanger 556 (i.e., the portion having the heat-discharging portions of the constituent heat pipes) extends into, and suitably all the way across, the portion of the airflow passageway 520 that is located downstream of the evaporator 540.

Thus, when the heat exchanger 556 is in the first position (and, accordingly, the AWH 500 is in its first, maximum pre-cooling operational configuration), relatively warm incoming air will pass over or across the heat-absorbing portion 559 of the heat exchanger 556, thereby causing the working fluid inside the heat exchanger heat pipes to vaporize; that vaporization removes heat from the incoming air and hence pre-cools it before it passes across the evaporator 540. Furthermore, as it passes across the evaporator 540, the air being treated will be cooled even further as moisture condenses out of it. The cooled air then continues to flow downstream from the evaporator 540 and passes over or across the heat discharge portion 561 of the heat exchanger 556. The cooled air absorbs heat from the heat discharge portion 561, thus allowing the working fluid inside the heat pipes to condense back into a liquid, and carries the absorbed heat away with it as it exits the AWH 500 via outlet 504.

On the other hand, when pre-cooling of the incoming air is needed or desired to a lesser extent (e.g., if it is not needed or desired at all), the heat exchanger 556 is moved (e.g., pivoted) from the first position shown in FIG. 9 to the second position shown in FIG. 10 such that the AWH 500 is converted to its second, minimum pre-cooling operational configuration. (This may be accomplished either manually or automatically under computer control.) When it is in the second position, the heat exchanger 556 will reside essentially within either the downstream portion of the airflow passageway 520 relative to the evaporator 540 (as shown in FIG. 10) or the upstream portion of the airflow passageway 520 relative to the evaporator 540 (not shown). (The precise position of residence is less important than the fact that the heat exchanger should be so positioned/located as to have minimal impact on airflow, especially downstream from the evaporator 540.) Accordingly, the heat exchanger 556 will not extend between upstream and downstream portions of the airflow passageway; no heat transfer will take place from the former to the latter via the heat exchanger 556; and no pre-cooling will occur.

Figure 11:
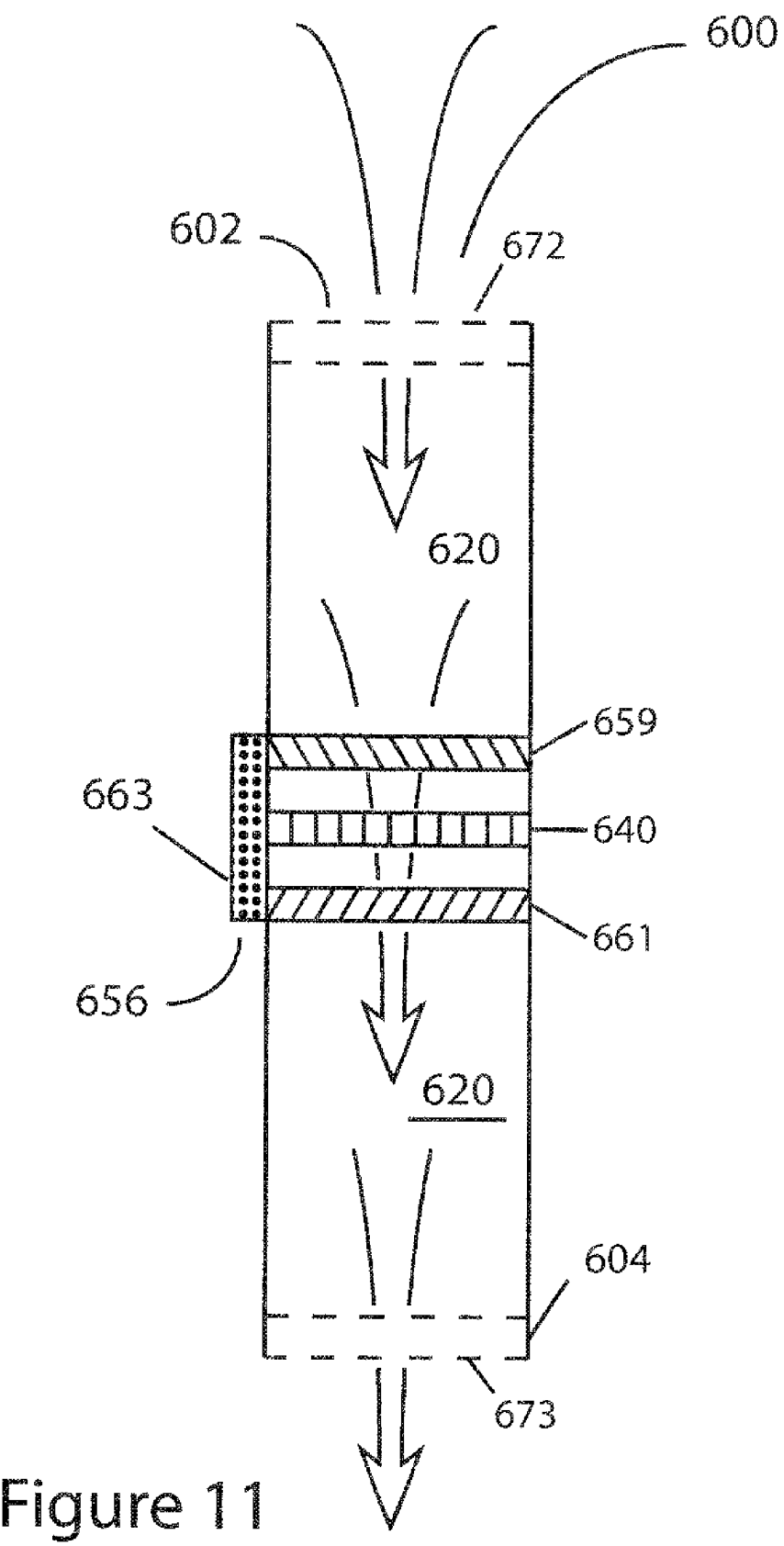
FIGS. 11 and 12 are schematic views (either plan or side elevation; either orientation would be acceptable) of a sixth embodiment of an atmospheric water harvester according to the invention illustrating the atmospheric water harvester in two different operational configurations.
Figure 12:
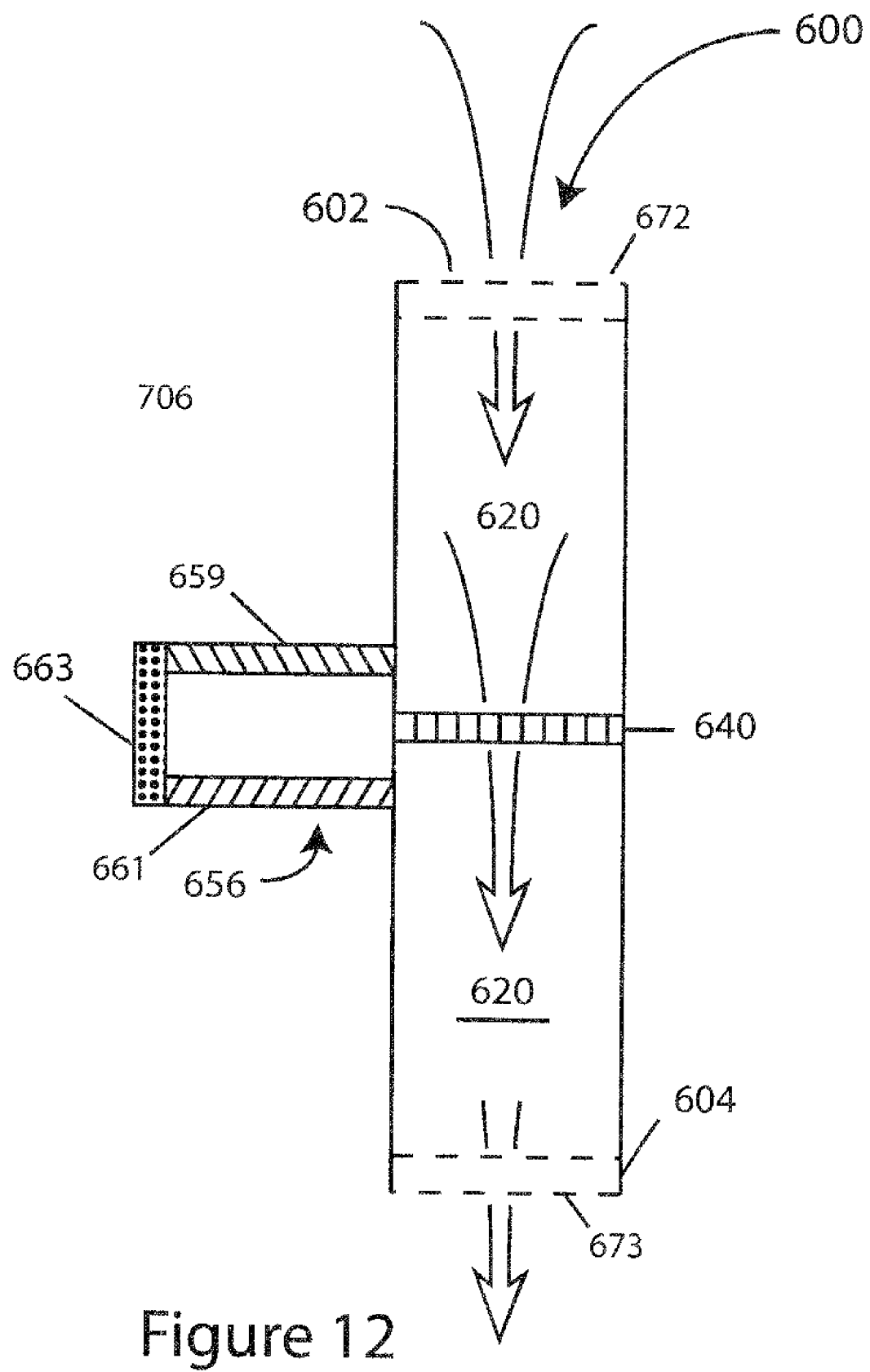

Another reconfigurable, generally similar embodiment 600 of an AWH is illustrated in FIGS. 11 and 12. In this embodiment, the fixed-configuration airflow passageway 620 is suitably straight and extends from inlet 602 at one end to outlet 604 at the opposite end. Evaporator (cooling member) 640 is located within the airflow passageway 620 and suitably extends all the way across it, as illustrated, so that all air flowing through the airflow passageway 620 must flow across/through it. (No other components of the refrigeration system in the embodiment 600 are illustrated, but they may be configured and located as per any of the embodiments described above.) One or more fans/impellers may be located at any suitable location to propel air through the airflow passageway 620. For example, fans 672, 673 may be provided near the inlet 602 and the outlet 604, respectively. The fan(s) may be single speed or variable speed depending on the desired sophistication of the system.

In the AWH embodiment 500 described above, the heat exchanger 556 is straight and the airflow passageway 520 is curved (e.g., U-shaped) so that when the heat exchanger 556 is in the first position it can extend between upstream and downstream portions of the airflow passageway 520 relative to the evaporator 540. Conversely, in the AWH embodiment 600, the airflow passageway 620 is essentially straight and the heat exchanger 656 is curved (e.g., U-shaped or C-shaped) so that part of it can be disposed upstream of the evaporator 640 and part of it can be disposed downstream of the evaporator 640 simultaneously. Thus, in the AWH 600, the heat exchanger 656—again exemplarily constructed using heat pipes—has a heat-absorbing portion 659 and a heat discharge portion 661 that are connected by means of bridge portion 663.

The first heat exchanger position (FIG. 11) is used when pre-cooling of the incoming air is desired or required; the second heat exchanger position (FIG. 12), on the other hand, is used when less (e.g., no) pre-cooling of the incoming air is required or desired. As shown in FIG. 11, when the heat exchanger 656 is in the first position, one portion of it 659 (i.e., the portion having the heat-absorbing portions of the constituent heat pipes) extends into, and suitably all the way across, the portion of the airflow passageway 620 that is located upstream of the evaporator 640, and another portion 661 of the heat exchanger 656 (i.e., the portion having the heat-discharging portions of the constituent heat pipes) extends into, and suitably all the way across, the portion of the airflow passageway 620 that is located downstream of the evaporator 640.

Thus, when the heat exchanger 656 is in the first position (and, accordingly, the AWH 600 is in its first, maximum pre-cooling operational configuration), relatively warm incoming air will pass over or across the heat-absorbing portion 659 of the heat exchanger 656, thereby causing the working fluid inside the heat exchanger heat pipes to vaporize; that vaporization removes heat from the incoming air and hence pre-cools it before it passes across the evaporator 640. Furthermore, as it passes across the evaporator 640, the air being treated will be cooled even further as moisture condenses out of it. The cooled air then continues to flow downstream from the evaporator 640 and passes over or across the heat discharge portion 661 of the heat exchanger 656. The cooled air absorbs heat from the heat discharge portion 661, thus allowing the working fluid inside the heat pipes to condense back into a liquid, and carries the absorbed heat away with it as it exits the AWH 600 via outlet 604.

On the other hand, when less (e.g., no) pre-cooling of the incoming air is needed or desired, the heat exchanger 656 is moved translationally (e.g., slid) from the first position shown in FIG. 11 to the second position shown in FIG. 12 such that the AWH 600 is converted to its second, minimum pre-cooling operational configuration. (This may be accomplished either manually or automatically under computer control.) When it is in the second position, either or both (as illustrated) of the heat-absorbing and the heat-discharging portions of the heat exchanger 656 will reside entirely outside of the airflow passageway 620 and will offer no impediment to smooth airflow. Accordingly, the heat exchanger 656 will not extend between upstream and downstream portions of the airflow passageway; no heat transfer will take place from the former to the latter via the heat exchanger 656; and no pre-cooling will occur.

Reverting to more general discussion applicable to any of the embodiments disclosed herein, unwanted mixing between intake and exhaust air has the potential to reduce the humidity of the intake air, which would have the effect of increasing energy use and decreasing water production. The intake and exhaust are located on generally opposite sides of the apparatus to separate them as much as possible without using intake or exhaust pipe extensions. In still air, exhaust will generally tend to be propelled away from the apparatus while intake air will be drawn from the ambient air at the other end. Where a water harvester is operated outdoors, changing wind direction and velocity may be anticipated. Shift of wind direction will have an impact upon the potential for mixing intake and exhaust air, particularly when the wind is blowing from the exhaust end and toward the intake end of the water harvester. Optimum conditions for minimum mixing of intake and exhaust air occur when the wind is blowing generally on the intake and away from the exhaust.

A manual switch may be provided on the control panel (not shown) to initiate a timed cycle in which the air system operates but the condenser system is turned off. This allows air to be passed through the unit without water being condensed from the air. This provides for drying of the internal air courses and their surfaces (including the evaporator and condenser). At the initiation of the cleaning/drying cycle, dilute chlorine spray from a hand-pump rechargeable container is sprayed into the intake air stream in sufficient quantities so that all internal air passages, including the main condenser and water collection area, are sufficiently exposed to allow for effective sterilization of the system. The unit continues to run, which has the effect of drying the internal surfaces and leaving the unit dry. If it is to be operated again in a relatively short time or if it is to be stored in a dry, climate-controlled location, packing in an air-tight container may not be necessary. Where the unit may be off for more than a short time, it should be packed in a sealed manner.

Provision may be made for quick-fitting a backup hand pump so that water may be filter-treated or removed from the water harvester under pressure if the pump 167 fails. It is also possible to recover the water directly from the removable water tank by removing it and pouring the water out manually.

The apparatus may be wheeled and has handles suitable for pulling or lifting, even on ground that is not flat or smooth, or it may be operated essentially fixed in place (as on a pedistal or platform, with no provision for hand moving. It is designed and fabricated to be robust and to be operated out of doors without regard for weather conditions. All embodiments of the water harvester are weather-proofed, with sealed electronics, louvered intakes, screening as part of the filter assembly 110 (all embodiments) and on intakes and exhausts. The apparatus is suitable for placement by hand, without mechanized lifting or towing equipment. It can be left in one location over a period of time and can be manually brought under cover for protection in advance of major storms and redeployed manually.

Furthermore, when a water harvester operates in very hot ambient conditions, the heat load on the refrigeration system as a whole may become very large—especially when it is performing a large amount of work. In that case, the ability to keep the refrigerant within an optimal range of operating temperatures may be exceeded at high heat loads if, as in the embodiments described above, there is essentially just a single stream of air passing through the AWH, with the air that passes over the evaporator being the same air and the only air that subsequently passes over the condenser to cool it. Therefore, to accommodate operation in hotter environments, any of the embodiments of an AWH illustrated herein and described above may be configured with a so-called "split condenser" refrigeration system. Such refrigeration systems are generally known and include multiple condensers (e.g., two), with additional, separate forced-air system(s) being provided to remove heat from the additional condenser(s) beyond the "primary" condenser. This supplements the cooling of the condenser by removing additional heat from the refrigerant stream and enhances total system heat rejection. The bias in the system toward greater heat rejection also helps to ensure that liquid refrigerant within the refrigeration system does not spontaneously begin to vaporize in an unintended manner.

Figure 13:
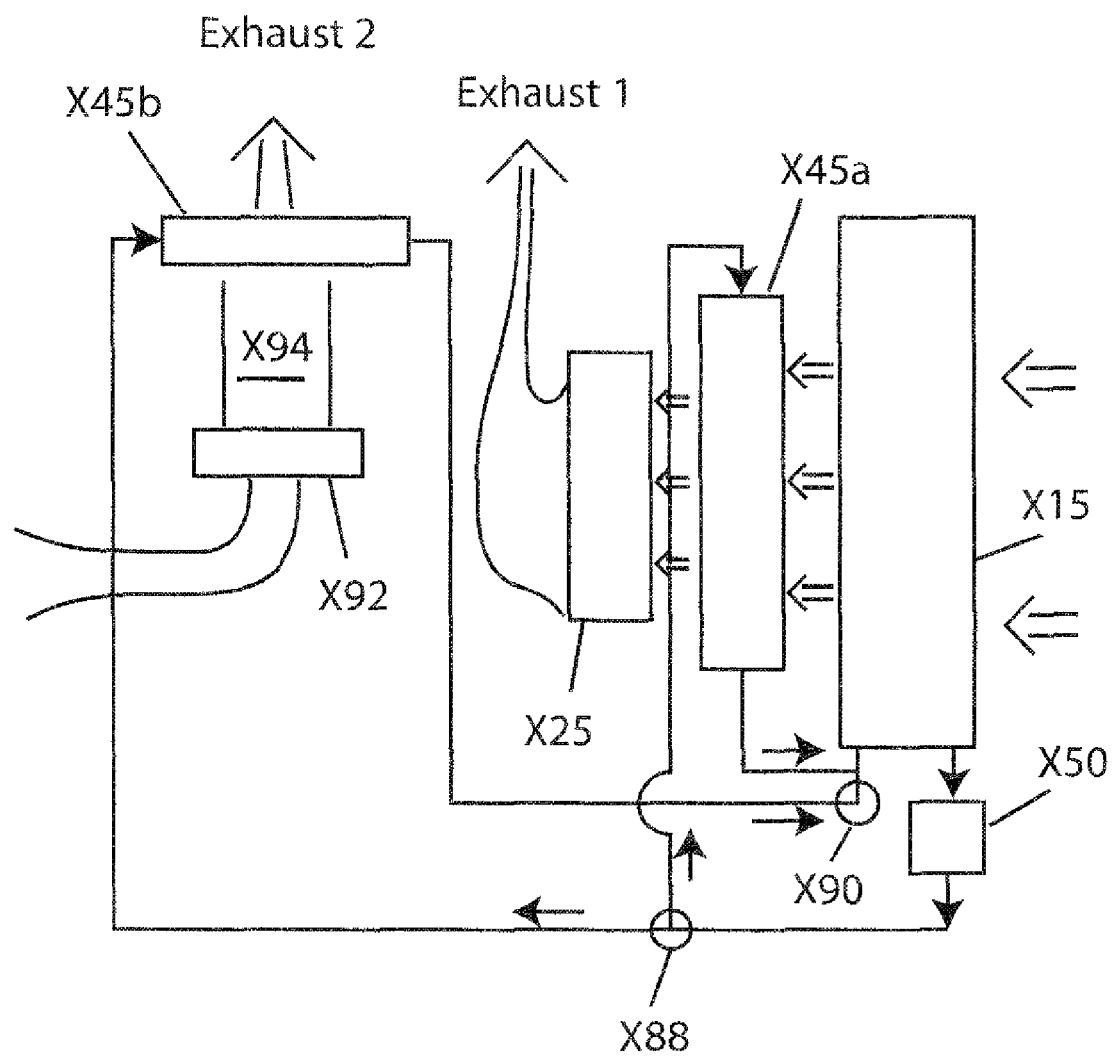
FIGS. 13 and 14 are schematic diagrams illustrating so-called "split-condenser" refrigeration systems with the condensers arranged in parallel and in series, respectively, that can be incorporated into any of the atmospheric water harvester embodiments disclosed herein.

FIG. 13 illustrates a split condenser refrigeration system that could be implemented in any of the AWH embodiments described above, with the condensers X45*a* and X45*b* arranged in parallel. ("X" is used as the first character of the reference numerals to indicate that the components could be as used in any of the AWH embodiments.) The refrigeration system includes the "primary" condensing unit X45*a* that operates directly with the water condensation system X15 (consisting of an evaporator and possibly other heat exchangers) and a compressor X50 (which may be implemented as more than one compressor operating in tandem). An impeller or fan X25 drives air through the primary system. (Open-stemmed arrows show airflow through the system and solid arrowheads on the refrigerant circulating system show flow direction.) Additional system heat rejection is achieved via "secondary" condensing unit X45*b* connected in parallel with the primary condensing unit X45*a*. In a parallel system, it possible to turn the secondary system on and off, which has the effect of reducing demand on the compressor, by opening or closing the upstream valve X88 (upstream with respect to the secondary condensing unit X45*b*) and the downstream valve X90, which valves link the secondary system to the primary recirculation refrigeration system. A separate fan X92 drives a supplemental airstream X94 across the secondary condensing unit X45*b*. Being able to close off the additional heat rejection capability is desirable in conditions of low system load (e.g., lower temperature and higher humidity) and to prevent unwanted refrigerant migration when portions of the system are turning on and off while operating in a low-demand mode. There are also technical improvements to system performance that can be achieved by bypassing the secondary condenser X45*b* during low load, though it adds system control complexity.

Figure 14:
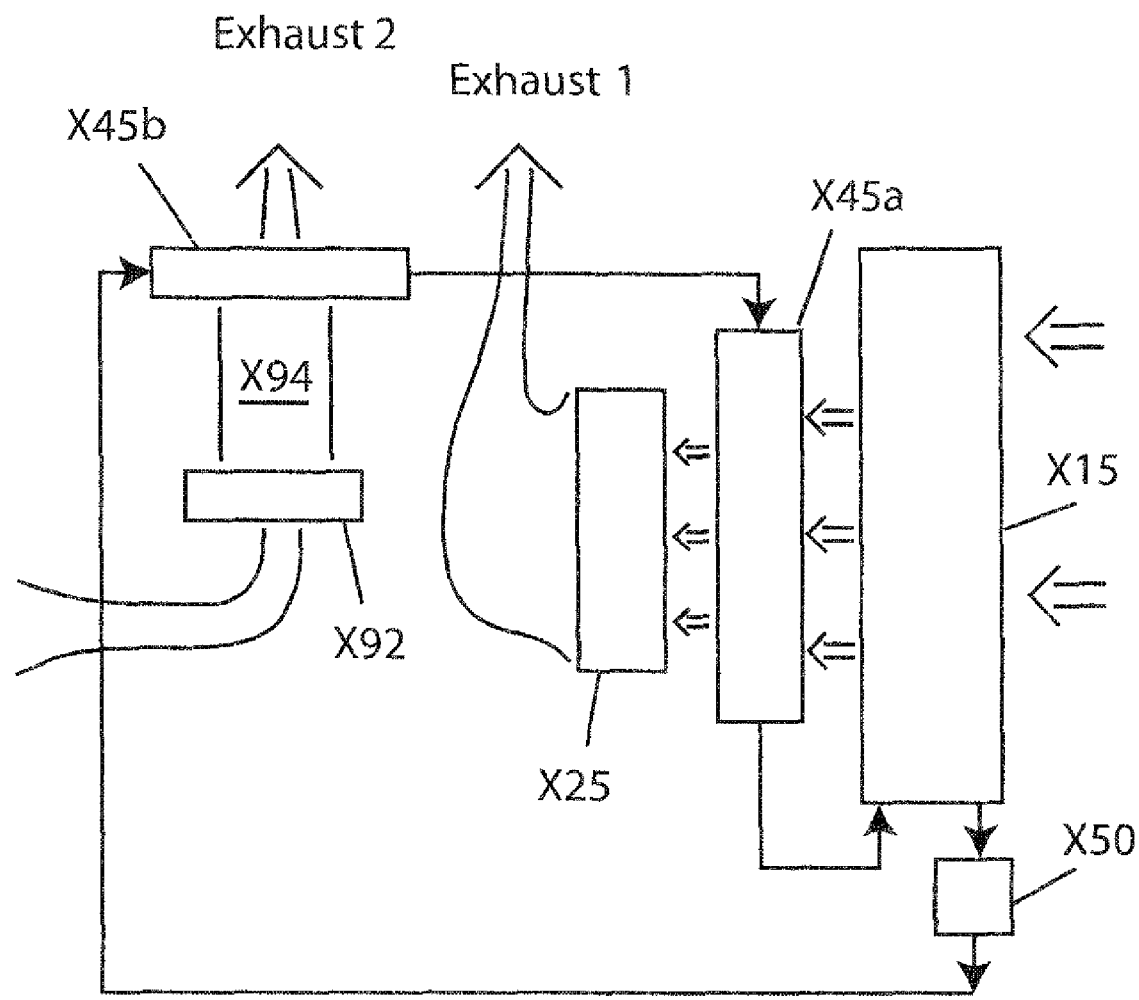

FIG. 14 illustrates a split condenser refrigeration system that could be implemented in any of the AWH embodiments described above, with the condensers X45*a* and X45*b* arranged in series. The primary condenser X45*a*, the water condensation system X15, the fan or impeller X25, and the airflow for the primary system are the same as in FIG. 13. The overall recirculation refrigeration system, however, consists of just a single loop that runs from the compressor X50 through first one condenser X45*b* and then the other condenser X45*a*. FIG. 14 shows the compressed refrigerant being passed first through the additional heat-rejecting condenser X45*b* and then through the primary condenser X45*a*. Although the order in which the refrigerant fluid passes through the two condensers could be reversed, our experience is that greater system performance is achieved by removing heat from the vicinity of the primary refrigeration system. There may also be a subcooler (not shown) associated with the primary condenser that ensures the refrigerant is liquid when it reaches the metering device that controls input of the refrigerant into the evaporator. Serial operation also requires fewer sensors, valves, and a simpler control system.

The foregoing disclosure is only intended to be exemplary of the methods and apparatus of the present invention. Departures from and modifications to the disclosed embodiments may occur to those having skill in the art. For example, while an air-to-air heat exchanger or heat pipes as disclosed and described may be preferred, other forms of heat exchangers such as a fluid loop recirculation system or an inverse vapor compression refrigeration system running in tandem with the "primary" refrigeration section may be implemented. Furthermore, the evaporator of a vapor compression-based refrigeration system is but one type of cooling device that may be used to cool the incoming air. Other cooling devices such as thermoelectric cooling devices could also be used. The scope of the invention is set forth in the following claims.

We claim:

1. A selectively variable pre-cooling atmospheric water harvester (AWH), comprising:
    a housing having a first inlet and one or more outlets;
    a first airflow passageway extending through the housing from said first inlet to said one or more outlets;
    a cooling member disposed within the first airflow passageway for condensing atmospheric moisture;
    a heat exchanger that is configured so as to be able to transfer heat from air flowing through one portion of the first airflow passageway to air flowing through another portion of the first airflow passageway; and
    one or more fans or impellers arranged to propel air through the atmospheric water harvester;
    wherein the atmospheric water harvester has at least a first, maximum pre-cooling operational configuration and a second, minimum pre-cooling operational configuration and is selectively reconfigurable therebetween;
    wherein in the first, maximum pre-cooling operational configuration of the AWH, the heat exchanger transfers heat from air flowing through a portion of the first airflow passageway that is located upstream of the cooling member (an upstream portion of the first airflow passageway) to air flowing through a portion of the first airflow passageway that is located downstream of the cooling member (a downstream portion of the first airflow passageway), whereby the net airflow flowing through the first airflow passageway is pre-cooled to a maximum extent before traversing the cooling member; and
    wherein in the second, minimum pre-cooling operational configuration of the AWH, the net airflow flowing through the first airflow passageway is pre-cooled to a minimum extent before traversing the cooling member.

2. The AWH of claim 1, wherein in the second, minimum pre-cooling operational configuration of the AWH, the heat exchanger does not transfer heat from the upstream portion of the first airflow passageway to the downstream portion of the first airflow passageway, whereby the net airflow flowing through the first airflow passageway is not pre-cooled at all before traversing the cooling member.

3. The AWH of claim 1,
    wherein the heat exchanger has a first heat exchange portion that is disposed upstream of the cooling member and a second heat exchange portion that is disposed downstream of the cooling member, the heat exchanger being arranged to transfer heat from air traversing the first heat exchange portion to cooler air that has traversed the cooling member and that is traversing the second heat exchange portion, whereby air entering the first airflow passageway through the first inlet can be pre-cooled before traversing the cooling member;
    wherein the AWH has a second, bypass inlet arranged to introduce air into the first airflow passageway at a location downstream of the heat exchanger's first heat exchange portion and upstream of the cooling member, whereby air entering the first airflow passageway through the second inlet is not pre-cooled before traversing the cooling member; and
    wherein the operational configuration of the AWH is determined by attributes of the AWH that affect the relative amounts of air entering the AWH through the first and second inlets.

4. The AWH of claim 3, wherein the heat exchanger comprises an air-to-air heat exchanger; the first heat exchange portion comprises a first set of heat transfer flow passageways; and the second heat exchange portion comprises a second set of heat transfer flow passageways in thermal communication with the first set of heat transfer flow passageways.

5. The AWH of claim 3, wherein the relative sizes of the first and second inlets are variable so as to control the relative amounts of air entering the first airflow passageway through the first and second inlets.

6. The AWH of claim 5, wherein the sizes of the first and second inlets directly and inversely co-vary, with the size of the first inlet being at a maximum when the size of the second inlet is at a minimum and vice-versa.

7. The AWH of claim 6, further comprising a sliding panel the position of which defines the relative sizes of the first and second inlets.

8. The AWH of claim 5, wherein the sizes of the first and second inlets are independently variable.

9. The AWH of claim 8, wherein the sizes of the first and second inlets are controlled by louvers, sphincter openings, or other flow-restricting devices.

10. The AWH of claim 5, wherein the minimum size of the second inlet is completely closed.

11. The AWH of claim 5, wherein the AWH has just two operational configurations with the first, maximum pre-cooling operational configuration being defined by a maximum size of the first inlet and a minimum size of the second inlet and the second, minimum pre-cooling operational configuration being defined by a minimum size of the first inlet and a maximum size of the second inlet.

12. The AWH of claim 5, wherein the AWH has three or more operational configurations with the first, maximum pre-cooling operational configuration being defined by a maximum size of the first inlet and a minimum size of the second inlet; with the second, minimum pre-cooling operational configuration being defined by a minimum size of the first inlet and a maximum size of the second inlet; and with one or more intermediate pre-cooling operational configurations being defined by an intermediate size of the first inlet and/or an intermediate size of the second inlet; wherein the net airflow flowing through the first airflow passageway is pre-cooled to an intermediate extent before traversing the cooling member when the AWH is in the intermediate pre-cooling operational configuration or configurations.

13. The AWH of claim 3, wherein said one or more fans or impellers comprise a variable speed fan or impeller associated with each of the first and second inlets whereby the relative amounts of air entering the first airflow passageway through the first and second inlets can be controlled by varying the speeds of the respectively associated fans or impellers.

14. The AWH of claim 13, wherein the AWH has just two operational configurations with the first, maximum pre-cooling operational configuration being defined by a maximum speed of the fan associated with the first inlet and a minimum speed of the fan associated with the second inlet and the second, minimum pre-cooling operational configuration being defined by a minimum speed of the fan associated with the first inlet and a maximum speed of the fan associated with the second inlet.

15. The AWH of claim 13, wherein the AWH has three or more operational configurations with the first, maximum pre-cooling operational configuration being defined by a maximum speed of the fan associated with the first inlet and a minimum speed of the fan associated with the second inlet; with the second, minimum pre-cooling operational configuration being defined by a minimum speed of the fan associated with the first inlet and a maximum speed of the fan associated with the second inlet; and with one or more intermediate pre-cooling operational configurations being defined by an intermediate speed of the fan associated with the first inlet and/or an intermediate speed of the fan associated with the second inlet; wherein the net airflow flowing through the first airflow passageway is pre-cooled to an intermediate extent before traversing the cooling member when the AWH is in the intermediate pre-cooling operational configuration or configurations.

16. The AWH of claim 1, wherein the heat exchanger is mounted such that it can be repositioned between a first position corresponding to the first, maximum pre-cooling operational configuration of the AWH and a second position corresponding to the second, minimum pre-cooling operational configuration of the AWH with the operational configuration of the AWH being determined by the position of the heat exchanger;
wherein when the AWH is in the first, maximum pre-cooling operational configuration, a first heat exchange portion of the heat exchanger is disposed within the upstream portion of the first airflow passageway and a second heat exchange portion of the heat exchanger is disposed within the downstream portion of the first airflow passageway with the heat exchanger being positioned so as to transfer a maximum amount of heat from air traversing the first heat exchange portion of the heat exchanger to cooler air that has traversed the cooling member and that is traversing the second heat exchange portion of the heat exchanger, whereby air flowing through the first airflow passageway is pre-cooled to a maximum extent before traversing the cooling member; and
wherein when the AWH is in the second, minimum pre-cooling operational configuration, it is positioned so as to transfer a minimum amount of heat from air traversing the first heat exchange portion of the heat exchanger to cooler air that has traversed the cooling member and that is traversing the second heat exchange portion of the heat exchanger, whereby air flowing through the first airflow passageway is pre-cooled to a minimum extent before traversing the cooling member.

17. The AWH of claim 16, wherein in the second, minimum pre-cooling operational configuration of the AWH, the heat exchanger is positioned such that it does not transfer heat from the upstream portion of the first airflow passageway to the downstream portion of the first airflow passageway, whereby the net airflow flowing through the first airflow passageway is not pre-cooled at all before traversing the cooling member.

18. The AWH of claim 16, wherein the first airflow passageway is configured such that at least a segment of the downstream portion of the first airflow passageway is in proximity to at least a segment of the upstream portion of the first airflow passageway;
wherein the heat exchanger is pivotally mounted so as to pivot between said first position and said second position; and
wherein the first heat exchange portion of the heat exchanger is disposed in said segment of the upstream portion of the first airflow passageway and the second heat exchange portion of the heat exchanger is disposed within said segment of the downstream portion of the first airflow passageway when the heat exchanger is in said first position.

19. The AWH of claim 18, wherein the heat exchanger lies entirely within the upstream portion of the first airflow passageway or entirely within the downstream portion of the first airflow passageway when it is in said second position whereby the net airflow flowing through the first airflow passageway is not pre-cooled at all before traversing the cooling member.

20. The AWH of claim 16, wherein the heat exchanger is generally C-shaped or U-shaped and is mounted so as to move translationally between said first position and said second position.

21. The AWH of claim 20, wherein the first and/or the second heat exchange portion of the heat exchanger lies or lie entirely outside of the first airflow passageway when the heat exchanger is in said second position whereby the net airflow flowing through the first airflow passageway is not pre-cooled at all before traversing the cooling member.

22. The AWH of claim 16, wherein the heat exchanger comprises heat pipes.

23. The AWH of claim 1, wherein the cooling member is metal and has a coating which prevents metal from dissolving into water condensing thereon.

24. The AWH of claim 1, wherein the cooling member has an antimicrobial coating thereon.

25. The AWH of claim 1, wherein the AWH comprises a vapor compression-based refrigeration system including at least one condenser, an evaporator, and a compressor and said cooling member comprises said evaporator.

26. The AWH of claim 25, wherein the refrigeration system includes a second airflow passageway and said at least one condenser comprises a primary condenser and a secondary condenser with the primary condenser being disposed within the first airflow passageway and the secondary condenser being disposed within the second airflow passageway.

27. The AWH of claim 26, wherein the primary and secondary condensers are arranged in parallel.

28. The AWH of claim 26, wherein the primary and secondary condensers are arranged in series.

29. The AWH of claim 25, wherein the compressor is a variable speed compressor.

30. The AWH of claim 1, further comprising a water collection region disposed below said cooling member for collecting water that has condensed on said cooling member and that has run off of said cooling member under the influence of gravity.

31. The AWH of claim 30, further comprising a pump disposed within said water collection region for transferring water from said water collection region to a user.

32. The AWH of claim 31, further comprising a water filter through which water transferred by said pump passes.

33. The AWH of claim 3, further comprising an air filter associated with each of said first and second inlets.

* * * * *